US006698946B1

(12) United States Patent
Piccinino, Jr. et al.

(10) Patent No.: US 6,698,946 B1
(45) Date of Patent: Mar. 2, 2004

(54) DUAL GROOVE PHOTOGRAPHIC PROCESSING DRUM

(75) Inventors: Ralph L. Piccinino, Jr., Rush, NY (US); Daniel M. Pagano, Honeoye Falls, NY (US)

(73) Assignee: Eastman Kodak Company, Rochester, NY (US)

( * ) Notice: Subject to any disclaimer, the term of this patent is extended or adjusted under 35 U.S.C. 154(b) by 7 days.

(21) Appl. No.: 10/293,651

(22) Filed: Nov. 13, 2002

(51) Int. Cl.[7] .................................................. G03B 3/08
(52) U.S. Cl. ....................... 396/612; 396/615; 396/633; 396/635; 355/27
(58) Field of Search ................................. 396/612, 615, 396/625, 633–636, 641; 355/27–29, 77; 134/64 P, 64 R, 122 P, 122 R

(56) References Cited

U.S. PATENT DOCUMENTS

| | | | |
|---|---|---|---|
| 3,792,651 | A | 2/1974 | Banks |
| 3,986,537 | A | 10/1976 | Wilhere |
| 4,005,463 | A | 1/1977 | Kowalski |
| 4,013,412 | A | 3/1977 | Mukae |
| 4,178,088 | A | 12/1979 | Harding |
| 4,269,501 | A | 5/1981 | Griffith et al. |
| 4,277,159 | A | 7/1981 | Descotes |
| 4,431,294 | A | 2/1984 | Baker |
| RE34,188 | E | 3/1993 | Kuzyk et al. |
| 5,349,412 | A | 9/1994 | Miyasaka |

*Primary Examiner*—D. Rutledge
(74) *Attorney, Agent, or Firm*—David A. Novais

(57) ABSTRACT

The present invention provides for a circular processing drum that defines a processing chamber therein. The circular processing drum includes a first media path for media of a first type which includes a first set of grooves in opposing walls of the processing drum, and a second media path which includes a further set of grooves in the opposing walls of the processing drum. The combination of the first and second media paths provides for a drum that is capable of processing multiple types of media while utilizing a minimum amount of space.

14 Claims, 34 Drawing Sheets

DUAL GROOVE PHOTOGRAPHIC PROCESSING DRUM

CROSS REFERENCE TO RELATED APPLICATIONS

The present application is related to the following pending patent applications: U.S. patent application Ser. No. 10/027,382 filed Dec. 21, 2001 U.S. Pat. No. 6,485,202, entitled PHOTOGRAPHIC PROCESSOR AND METHOD OF OPERATION; U.S. patent application Ser. No. 10/027,454 filed Dec. 21, 2001 U.S. Pat. No. 6,515,261, entitled A PROCESSING SOLUTION DELIVERY SYSTEM HAVING A SUPPLY TUBE AND LEVEL DETECTION SENSOR UNIT FOR USE WITH A PHOTOGRAPHIC PROCESSOR; U.S. patent application Ser. No. 10/027,381 filed Dec. 21, 2001 U.S. Pat. No. 6,485,204, entitled PHOTOGRAPHIC PROCESSOR HAVING AN ADJUSTABLE DRUM; U.S. patent application Ser. No. 10/027,432 filed Dec. 21, 2001, entitled CHEMICAL DELIVERY SYSTEM FOR USE WITH A PHOTOGRAPHIC PROCESSOR AND METHOD OF OPERATION; U.S. patent application Ser. No. 10/108,141 filed Mar. 27, 2002 U.S. Pat. No. 6,517,263, entitled PHOTOGRAPHIC PROCESSOR HAVING SIDE BY SIDE PROCESSING PATHS AND METHOD OF OPERATION and U.S. patent application Ser. No. 10/164,067 filed Jun. 5, 2002 U.S. Pat. No. 6,592,271 entitled PROCESSING SOLUTION DELIVERY SYSTEM FOR USE WITH A PHOTOGRAPHIC PROCESSOR AND METHOD OF OPERATION.

FIELD OF THE INVENTION

The present invention is directed to a photographic processing drum having a dual groove arrangement for processing multiple types of photographic film, and a method of operation.

BACKGROUND OF THE INVENTION

Photographic processors come in a variety of shapes and sizes from large wholesale photographic processors to small micro-labs. As photographic processors become more and more technologically sophisticated, there is a continued need to make the photographic processor as user-friendly and as maintenance-free as possible.

Currently available photographic processors have one or more of the following shortcomings: (1) the film processing time is relatively long; (2) some photographic processors, because of their size, require a large amount of space; (3) some photographic processors may require an unacceptable amount of processing solution due to the design of the processing tank; (4) some photographic processors generate an unacceptable amount of solution waste due to the design of the processing tank; and (5) some photographic processors are not readily adaptable to process multiple types of films.

What is needed in the art is a photographic processor, which provides exceptional print quality while requiring a minimal number of tasks necessary for an operator to process multiple types of film.

SUMMARY OF THE INVENTION

The present invention addresses some of the difficulties and problems discussed above by the discovery of a photographic processor having an internal drum design that includes dual grooves which are adapted to receive and convey multiple types of film.

The processor of the present invention is capable of processing multiple size media in a minimal amount of space. The grooves of the invention are used as edge support and reduce any damage of the media. The grooves of the present invention are also positioned in such a way that only the proper amount of chemistry or processing solution is added to the processor, in accordance with the size or the type of media, to reduce chemical waste.

The present invention therefore relates to a photographic processor which comprises a processing drum having a center axis. The processing drum defines a first circular media path located a first distance from the center axis for processing a first type of photographic media, and a second circular media path located a second distance from the center axis which is greater than the first distance for processing a second type of photographic media.

The present invention also relates to a photographic processor which comprises a processing drum having a first wall, a second wall which opposes the first wall, and a side wall which extends around a perimeter of with the drum, with the processing drum further comprising a rotational axis; first and second grooves defined in one of the first or second walls, with the first groove being located a first distance from the rotational axis and the second groove being located a second distance from the rotational axis which is greater than the first distance; and a disk positioned inside the drum adjacent to the other of the first or second walls. The disk has disk teeth thereon which are capable of interengaging with holes along an edge of photographic film to be processed. A first film path for processing a first type of film is defined between the first groove and the disk, such that a first edge of the first type of film is inserted in the first groove and at least one hole on a second edge of the first type of film is interengaged with the disk teeth on the disk. A second film path for processing a second type of film is defined between the second groove and the disk, such that a first edge of the second type of film is inserted in the second groove and at least one hole on a second edge of the second type of film is interengaged with the disk teeth on the disk.

The present invention also relates to a method of processing photographic material, which comprises the steps of inserting a photographic film to be processed into one of first and second circular film paths located in a circular processing drum having a center axis, in accordance with a type of the photographic film, with the first circular film path being located a first distance from the center axis and being adapted to receive a first type of the photographic film, and the second circular film path being located a second distance from the center axis which is greater than the first distance and being adapted to receive a second type of the photographic film; and processing the inserted photographic film in the processing drum.

These and other features and advantages of the present invention will become apparent after a review of the following detailed description of the disclosed embodiments and the appended claims.

BRIEF DESCRIPTION OF THE DRAWINGS

The present invention is further described with reference to the appended figures, wherein.

DETAILED DESCRIPTION OF THE INVENTION

Figure 1:
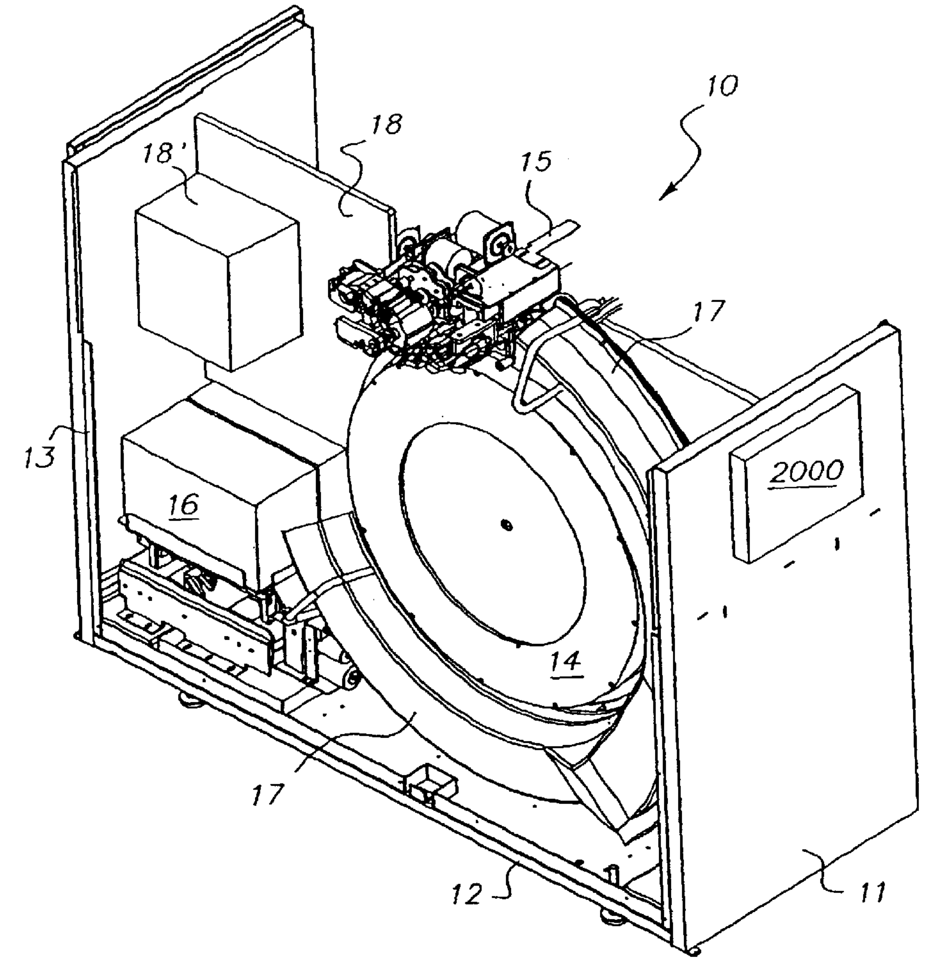
FIG. 1 is a frontal view of an exemplary photographic processor of the present invention.

An exemplary photographic processor is shown in FIG. 1. Photographic processor 10 comprises at least an outer housing, which includes a first side wall 11, a base housing member 12, and a second side wall 13. Photographic processor 10 includes a circular processing chamber or drum 14 (also referred to herein as the "circular processing drum 14"), which may be used to expose a given strip or roll of film to one or more photoprocessing chemicals. Photographic processor 10 further includes a film-loading/unloading device 15 positioned above and cooperating with circular processing drum 14. A chemical delivery system 16 is positioned for easy access by a user (i.e., for maintenance or replacement purposes) at a location near side wall 13 and base housing member 12. Photographic processor 10 also includes a circular dryer 17 in the form of, for example, a cylinder, for drying the processed film. Dryer 17 is concentrically and co-axially positioned around processing drum 14. Once a given strip or roll of film is dried in dryer 17, the film proceeds to a scanner 18', which may be positioned above chemical delivery system 16 in a space bordered by side wall 13 and left interior wall 18 or any other convenient location.

Figure 2:
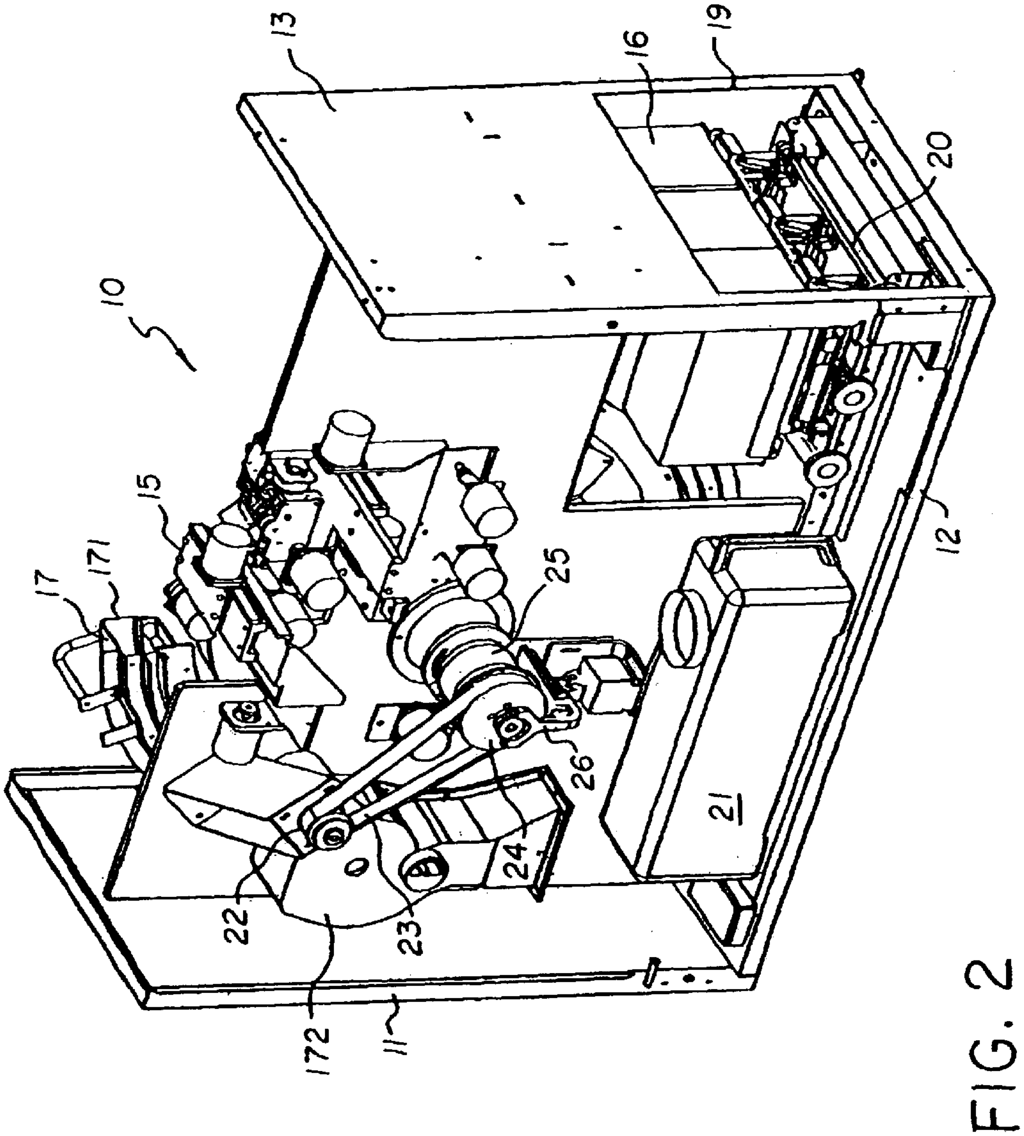
FIG. 2 is a rear view of an exemplary photographic processor of the present invention.

FIG. 2 depicts a rear view of photographic processor 10. As shown in FIG. 2, photographic processor 10 includes opening 19 in side wall 13 for accessing chemical delivery system 16. Sliding track mechanism 20 allows an operator to pull at least a portion of chemical delivery system 16 through opening 19 to an exterior location outside of photographic processor 10. Such an assembly allows for quick and easy maintenance and replacement of chemical delivery system 16. Photographic processor 10 can include a waste collection reservoir 21, which collects and stores used processing chemicals removed from circular processing drum 14 following development of a given strip or roll of film. As shown in FIG. 2, dryer 17 includes dryer entrance 171 and dryer blower 172. The various components of photographic processor 10 will be described in more detail below with reference to FIGS. 3–21.

Figure 3:
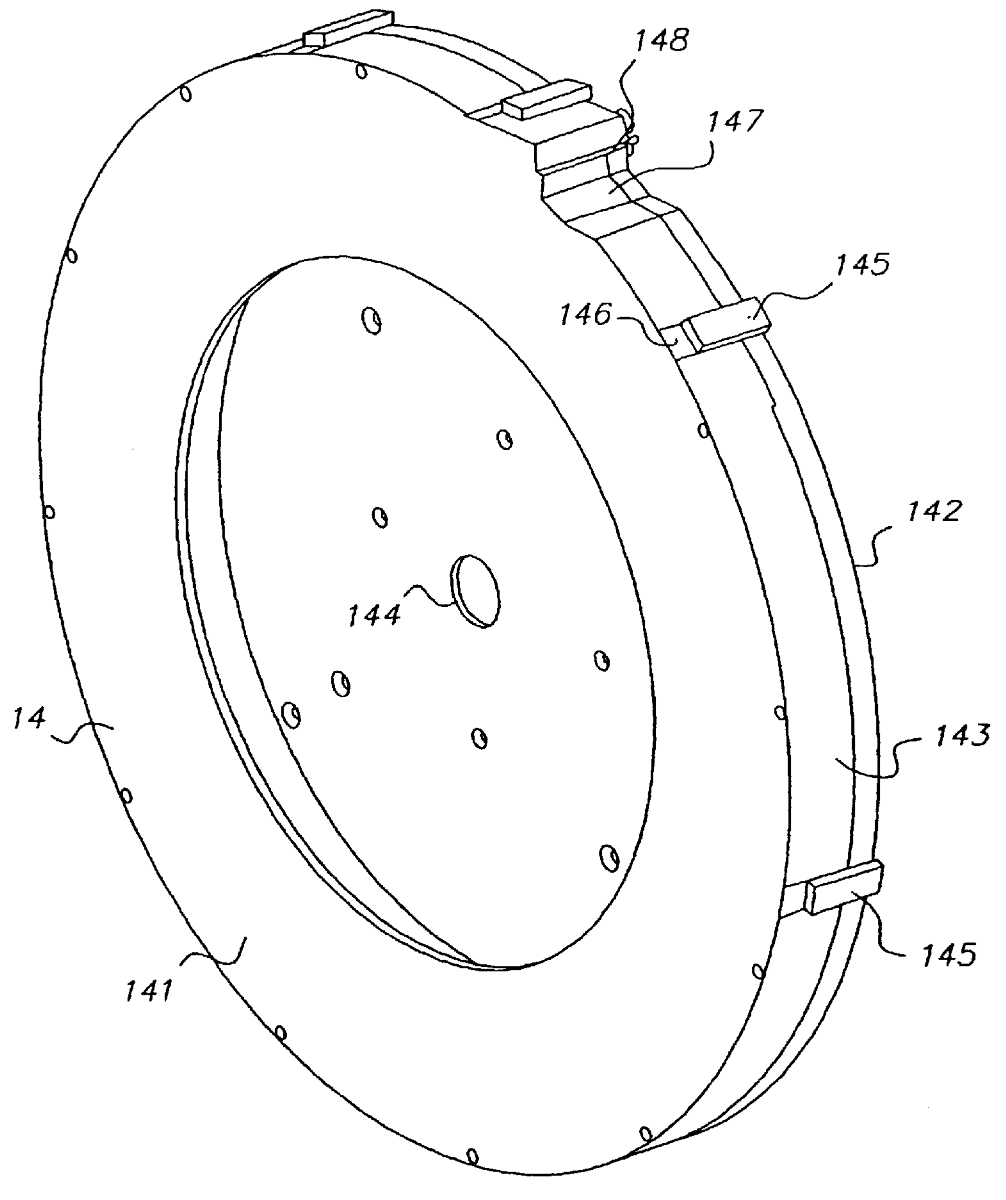
FIG. 3 depicts an exemplary circular processing drum used in the photographic processor of the present invention.

Circular processing drum 14 is further described in FIG. 3. As shown in FIG. 3, circular processing drum 14 includes a first or front wall 141, a second or back wall 142, a side wall 143, and a central axis opening 144. A portion of a drum and disk drive mechanism 25 (shown in FIGS. 2, 8 and 9) passes through central access opening 144. Circular processing drum 14 comprises two circular sections joined together at multiple locations around the perimeter of circular processing drum 14 via male clasping members 145 and female clasping members 146. It should be noted that any means for attaching the two circular components of circular processing drum 14 may be used in place of male clasping members 145 and female clasping members 146. Further, it should be noted that circular processing drum 14 may also be in the form of a single component as oppose to two circular components as shown in FIG. 3, although such a design may add manufacturing cost to circular processing drum 14.

Circular processing drum 14 further comprises a film cartridge loading area 147 on an outer surface of side wall 143 for loading film directly from a film cartridge into circular processing drum 14, such as with APS film. Circular processing drum 14 also comprises a film input slot 148, which enables the entry and exit of film into circular processing drum 14.

Figure 4:
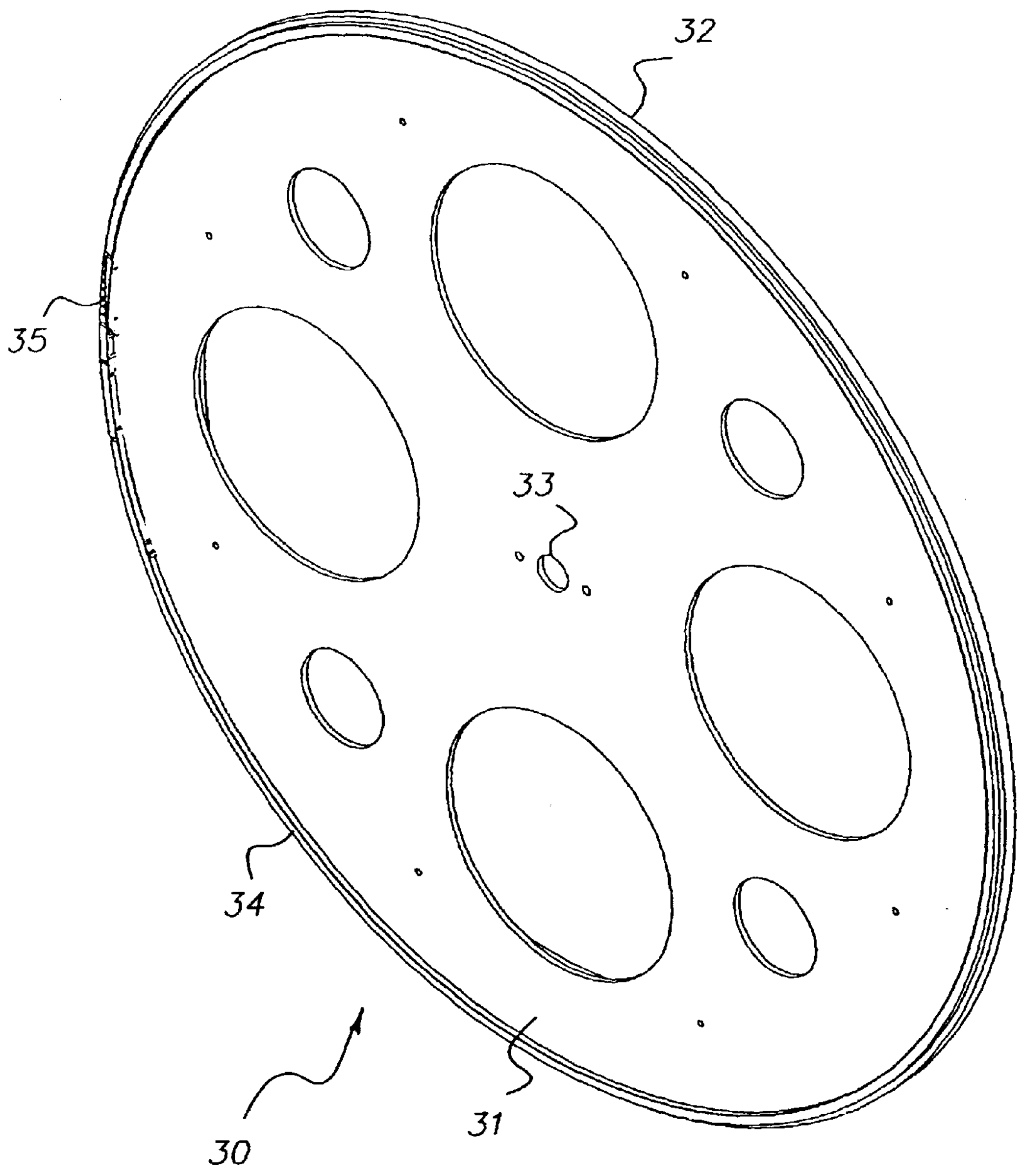
FIG. 4 depicts an exemplary disk located within the circular processing drum of the present invention.
Figure 5:
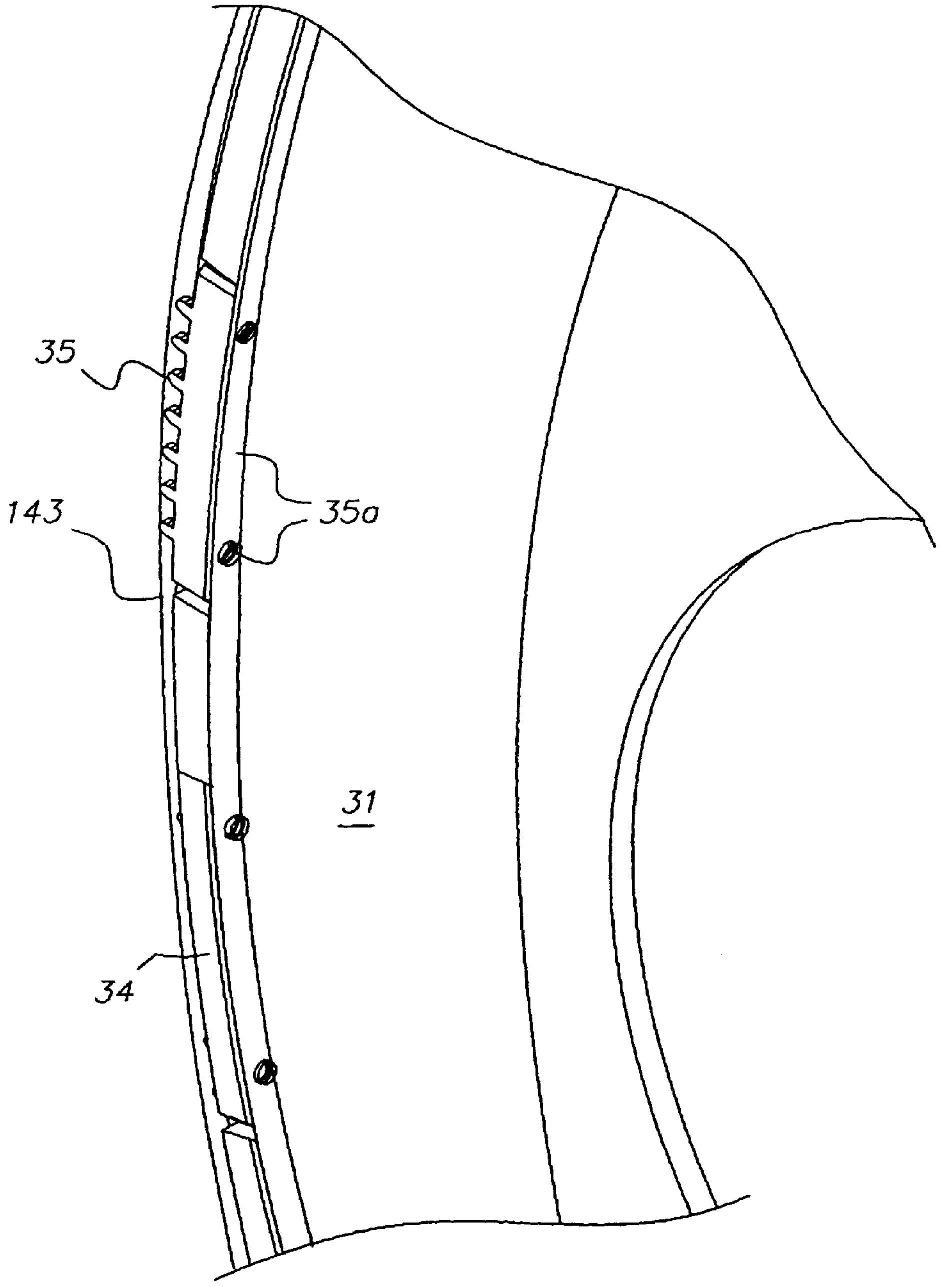
FIG. 5 displays a close-up view of an exemplary disk having an outer perimeter and one or more sets of disk teeth.
Figure 6:
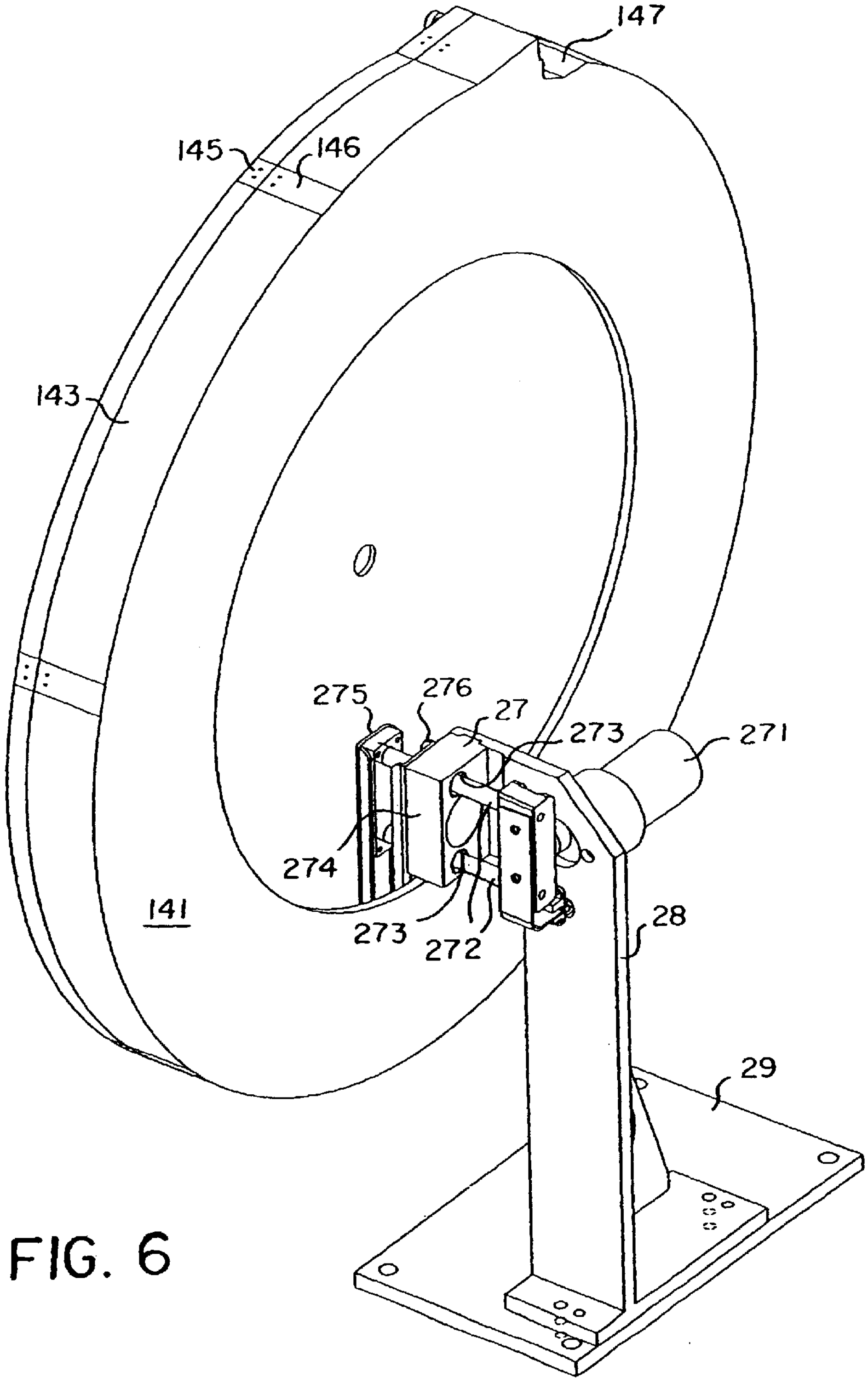
FIG. 6 depicts an exemplary roller mechanism positioned within the circular processing drum.

FIG. 4 depicts an exemplary disk 30, which is positioned within circular processing drum 14, and functions to convey film within circular processing drum 14 once the film enters through film input slot 148. Disk 30 includes a first face 31, a second face 32, a central access opening 33, an outer perimeter 34, and one or more sets of disk teeth 35 located along outer perimeter 34 of disk 30. As with circular processing drum 14, a portion of drum and disk drive mechanism 25 may extend into central access opening 33 to engage with and cause rotation of disk 30. FIG. 5 provides a close-up view of a portion of disk 30, and in particular, outer perimeter 34 and a set of disk teeth 35 on the outer perimeter 34 of disk 30. The outermost points of disk teeth 35 are in close proximity to an inner surface of side wall 143 of circular processing drum 14. In a feature of the invention, disk teeth 35 could be spring loaded through the use of spring arrangement 35*a*.

Figure 7:
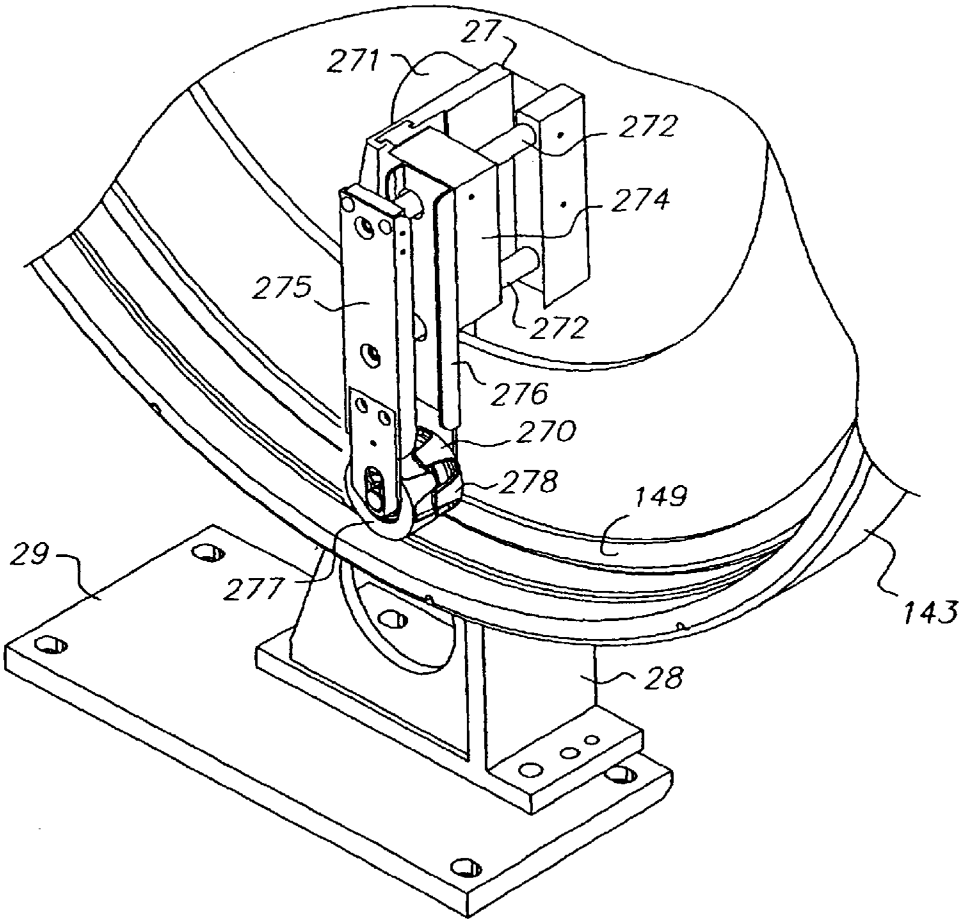
FIG. 7 depicts a rear view of the exemplary roller mechanism of FIG. 6.

An agitating roller arrangement 27 (FIGS. 6 and 7) is positioned within circular processing drum 14. Roller arrangement 27 includes an agitating roller 270 having interengaging members 277 and 278 (FIG. 7). Roller arrangement 27 may be supported by a support member 28, which is attached to a support member base 29. Support member base 29 may be permanently or temporarily attached to base housing member 12 (shown in FIGS. 1 and 2). Agitating roller arrangement 27 includes a motor 271, which provides motion to pistons 272 through openings 273 in a fixed positioning member 274. Pistons 272 proceed through stationary positioning support member 276 and are attached to movable positioning support member 275. As pistons 272 move, movable positioning support member 275 which is coupled to member 277 separates from stationary positioning support member 276 which is coupled to member 278. This permits roller 270 to be expandable between a first width when the members 277 and 278 overlap each other and a second width larger than the first width (FIG. 7) when the members 277 and 278 move away from each other.

FIG. 7 provides a detailed view of roller arrangement 27 and its various components. As shown in FIG. 7, movable positioning support member 275 and stationary positioning support member 276 connect to interengaging members 277 and 278 respectively as described above. During use, the film passes between roller 270 and an interior surface of drum 14. Roller 270 is freely rotatable and maintains the film flat along the lower portion of drum 14. As will be described later, roller 270 further provides an agitating feature within processing drum 14 during processing. Additionally, the width of roller 270 is adjustable as described above to accommodate a shorter width film (i.e. APS film) and a larger width film (i.e. 35 mm film). Further, roller arrangement 27 including roller 270 can be vertically adjustable to accommodate for film curl as the film passes between roller 270 and the interior surface of drum 14. As a still further option, roller 270 can be spring loaded so as to accommodate any variation in the interior surface of drum 14.

Figure 8:
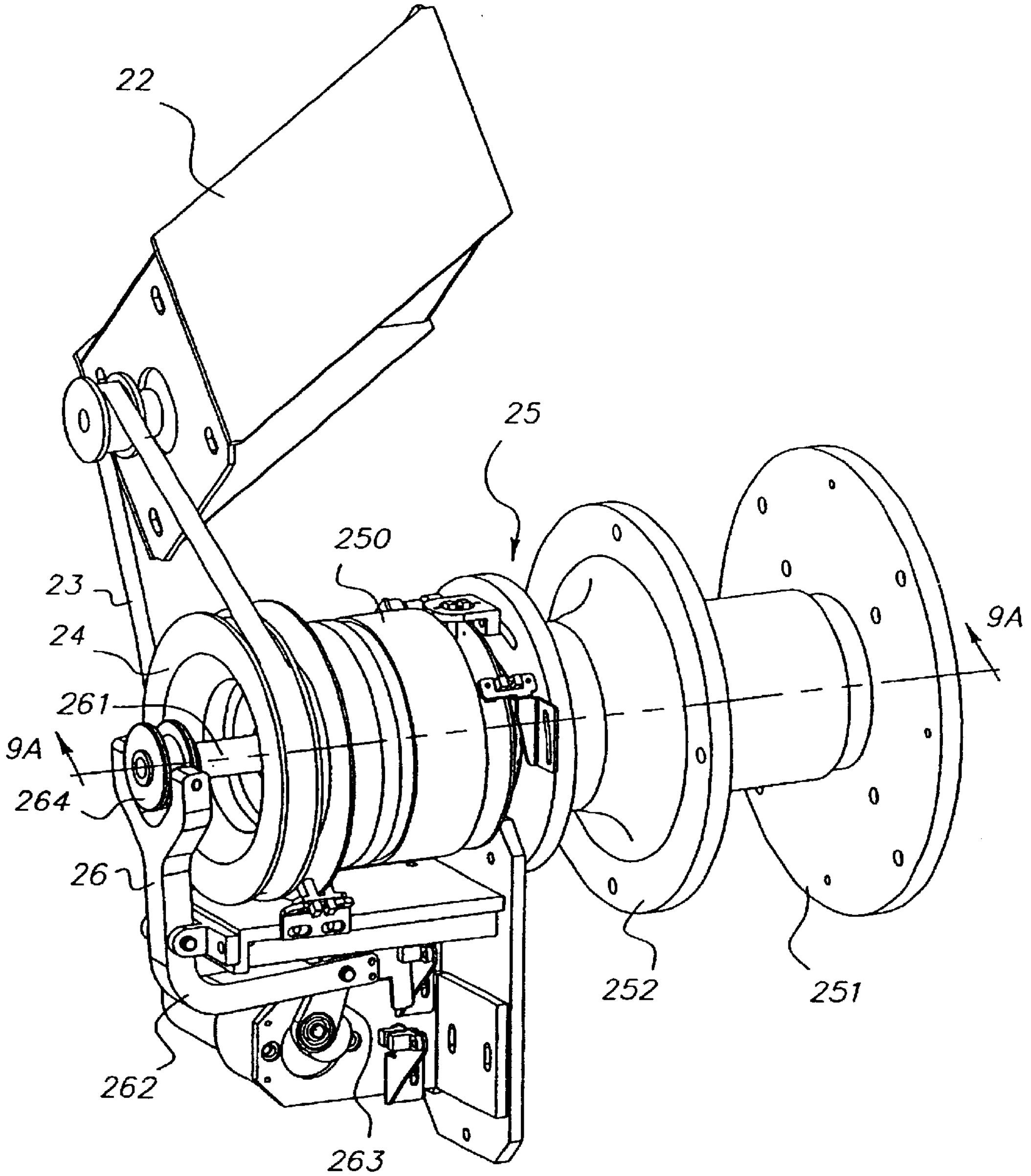
FIG. 8 depicts an exemplary drum and disk drive mechanism for rotating a circular processing drum, and a clutch mechanism for selectively engaging the drum and disk.
Figure 9A:
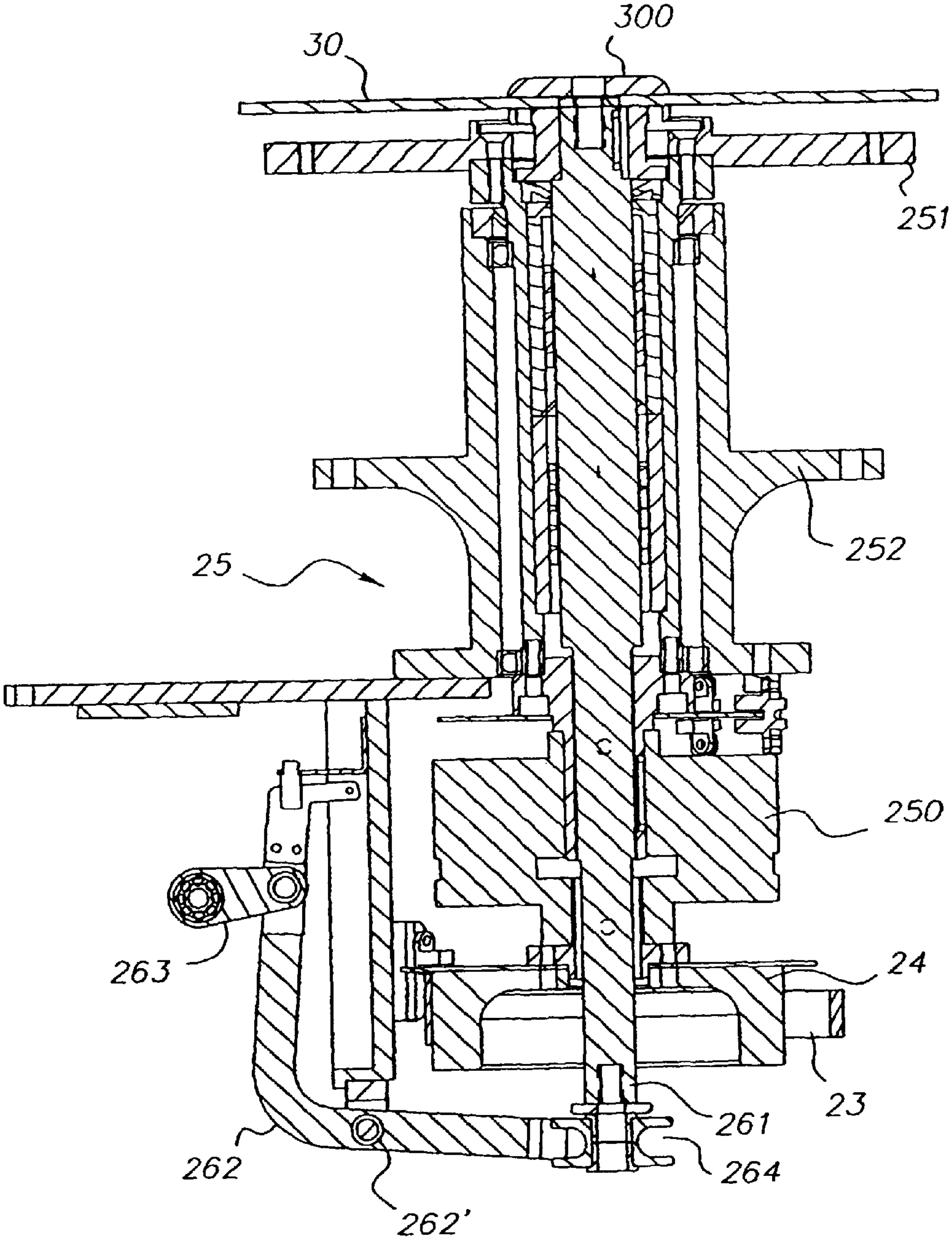
FIG. 9A displays a cross-sectional view of the drum and disk drive mechanism along line A—A in FIG. 8.

Circular processing drum 14 is connected to a drum and disk drive mechanism 25, which selectively rotates disk 30 relative to drum 14 to position and convey the film along and within processing drum 14, and rotates both disk 30 and drum 14 together during a processing and/or cleaning cycle. Circular processing drum 14 rotates about an axis of symmetry. An exemplary drum and disk drive mechanism 25 is shown in FIG. 8. Drum and disk drive mechanism 25 cooperates with a motor 22, a belt 23, and a pulley 24 as shown in FIGS. 8 and 9A. Drum and disk drive mechanism 25 includes a drive shaft 261 which is operationally connected to pulley 24. Also shown in FIGS. 8 and 9A are flanges 251 and 252. Flange 251 is connected to drum 14 while an end cap 300 holds disk 30 for rotation about drive shaft 261 (FIG. 9A). Actuation of motor 22 drives belt 23 which in turn drives pulley 24. This in turn causes a rotation of drive shaft 261 which rotates disk 30. Clutch mechanism 250 enables the engagement and disengagement of flange 251 to provide selective rotation to circular processing drum 14.

Figure 9B:
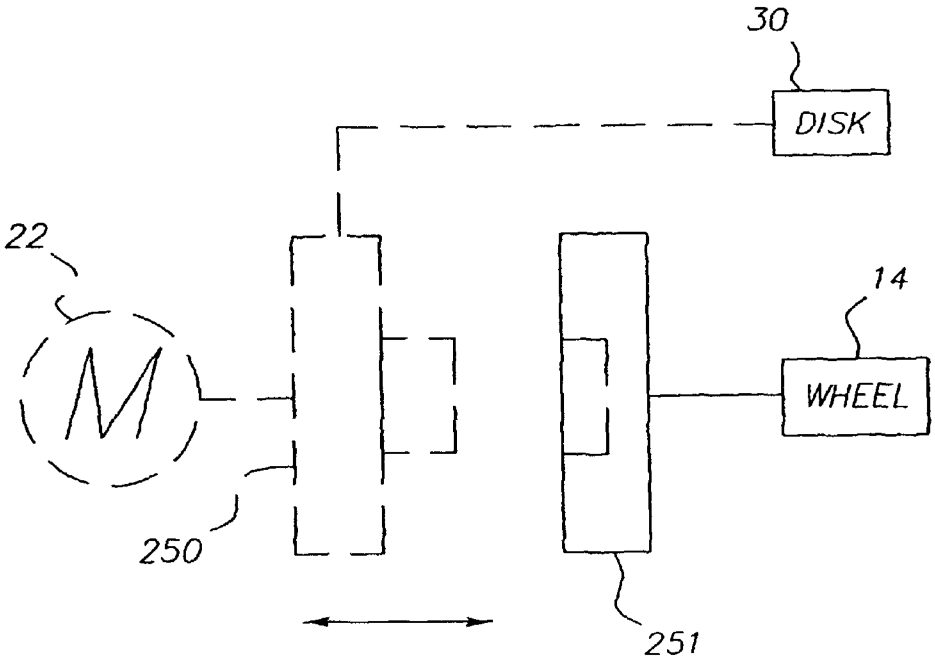
FIG. 9B schematically illustrates a driving and clutching arrangement of the invention.

FIG. 9A displays a cross-sectional view of drum and disk drive mechanism 25 and clutch mechanism 250 along line 9A—9A in FIG. 8. With reference to FIG. 9A and FIG. 9B which is a schematic representation of the driving and clutching feature of the present invention, an operation will now be described. When loading film which will be described with reference to FIGS. 10 and 11, clutch 250 is deactivated as shown in FIG. 9B. In this state, rotation of motor 22 will cause a rotation of drive shaft 261 and accordingly, a rotation of disk 30 relative to drum 14. This is due to the fact that clutch 250 is deactivated and therefore, drum 14 is not rotated. This permits the conveyance of the film by rotation of disk 30 to a desired location within drum 14. After the film reaches the desired location within drum 14, clutch 250 is activated, (for example, clutch 250 is moved to the right in FIG. 9B) by actuating clutch 250 with flange 251 which is attached to drum 14. Therefore, a rotation of motor 22 will cause a rotation of both disk 30 and drum 14. This occurs during the processing stages to process the film in a manner which will be described later, and also during a cleaning stage.

Drive shaft 261 can be moved perpendicularly and through flange 251 and flange 252 to move disk 30 attached thereto. As shown in FIG. 9A, drive shaft 261 is attached to a fitting 264 in a manner which permits drive shaft 261 to rotate relative to fitting 264. Fitting 264 is in turn rotatably attached to a pivotable arm 262 and a movable member 263. Movable member 263 can be operationally connected to a motor for rotation of member 263. This causes arm 262 to pivot about point 262' to move drive shaft 261 to the left or right when viewing FIG. 9A from above the page. Movement of drive shaft 261 as noted above, moves disk 30 in a direction parallel to an axis of disk 30. This facilitates the accommodation of, for example, 35 mm and APS film on disk 30, since the disk 30 can be moved based on the type of film being processed.

Figure 10:
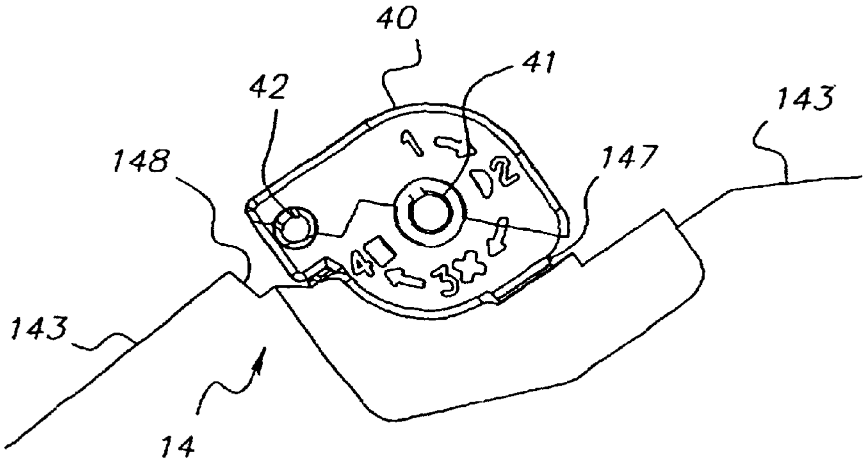
FIG. 10 depicts a film cartridge in a film-loading position using one film-loading method of the present invention.

Within the context of the present invention, a film may be loaded into circular processing drum 14 by a number of methods. One method of loading film, such as APS film, into circular processing drum 14 is shown in FIGS. 10–13. As shown in FIG. 10, film cartridge 40 comprising a film cartridge spool 41 and film cartridge door opening mechanism 52 is positioned in a film cartridge loading area 147 located on side wall 143 of circular processing drum 14. Film (not shown) exiting film cartridge 40 enters circular processing drum 14 at light tight film input slot 148 (FIG. 3) in side wall 143 of circular processing drum 14.

Figure 11:
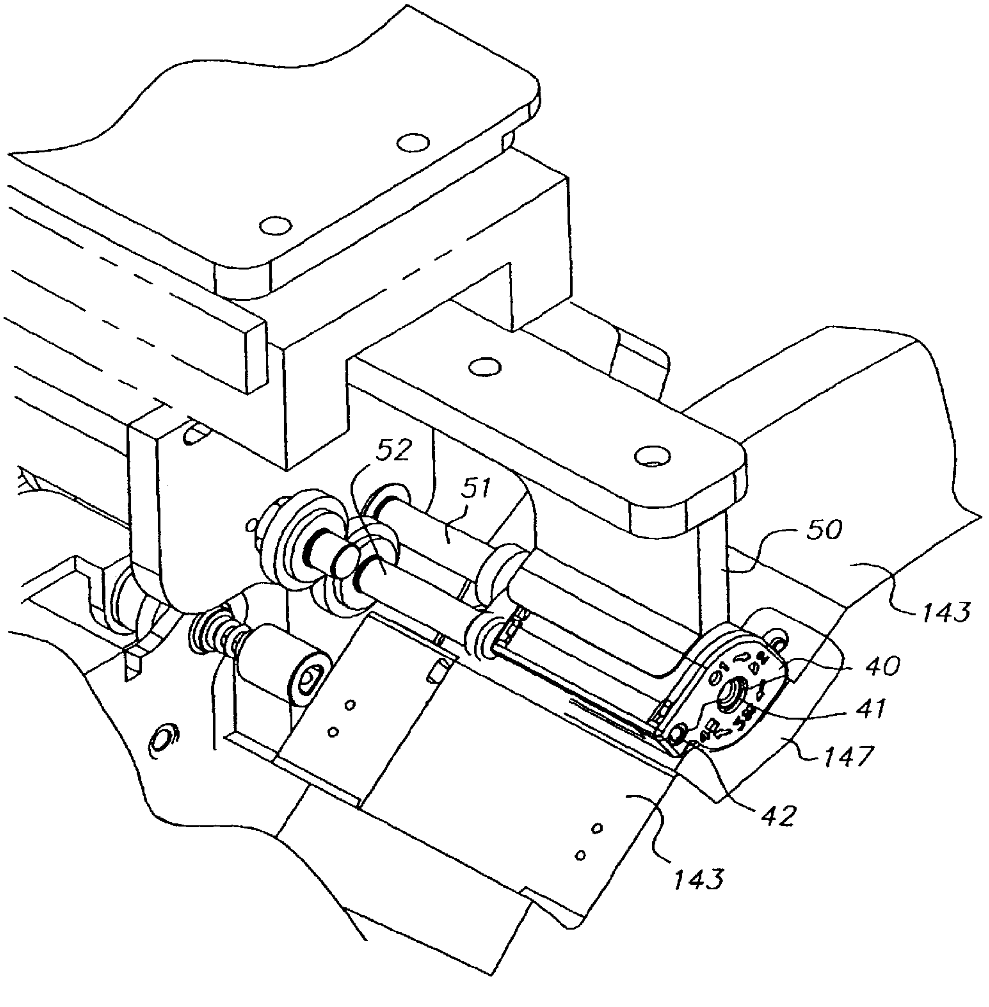
FIG. 11 depicts a film cartridge stabilizing step in one film-loading method of the present invention.

Once film cartridge 40 is positioned in film cartridge loading area 147, photographic processor 10 can initiate a number of film-loading and conveying steps, the results of which are shown in FIG. 11. It is noted that the film loading and conveying steps as well as other processing steps can be controlled by a computer or central processing unit (CPU) 2000 (FIG. 1) operationally associated with processor 10. In a first step, a film cartridge stabilizing member 50 applies an amount of pressure onto an upper surface of film cartridge 40 to prevent film cartridge 40 from moving while positioned in film cartridge loading area 147. Spool engaging member 51 and cartridge door opening mechanism engaging member 52 move toward film cartridge 40 and engage with film cartridge spool 41 and film cartridge door 42, respectively. Door opening mechanism engaging member 52 opens film cartridge mechanism 42 and spool engaging member 51 begins to rotate film cartridge spool 41, forcing film (not shown) out of film cartridge 40.

Figure 12:
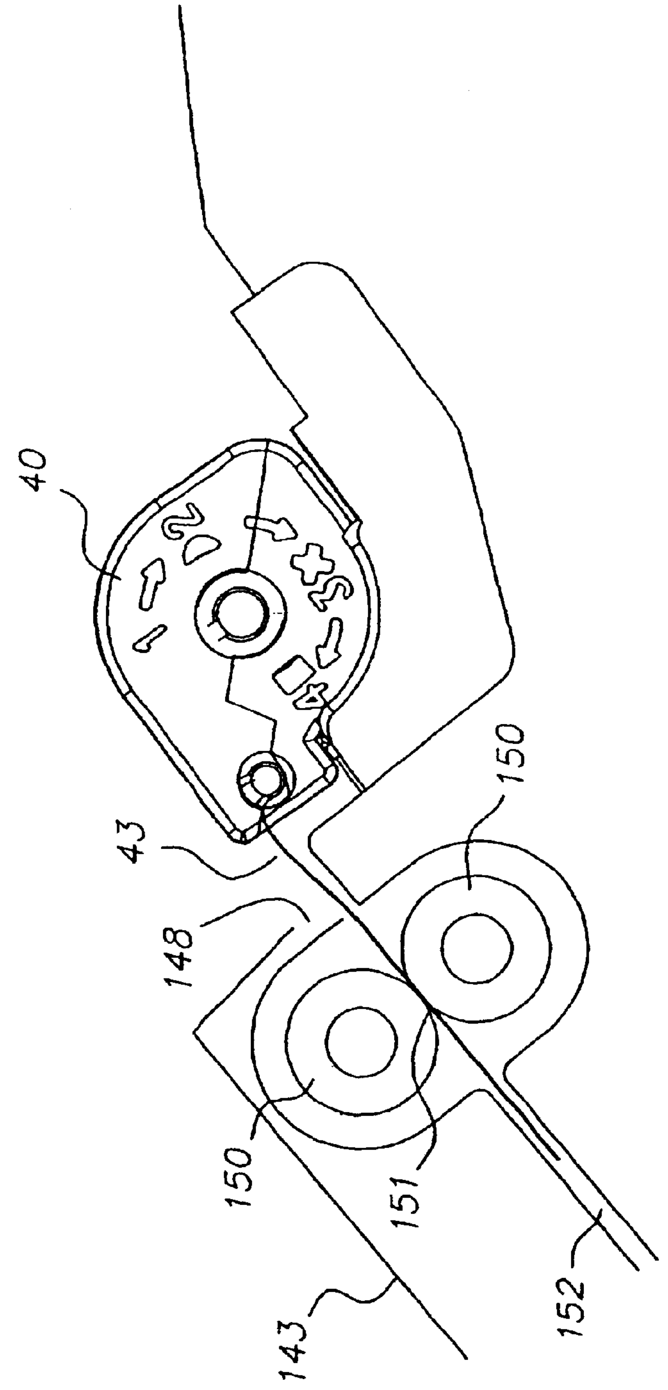
FIG. 12 depicts a film nipping step during a film-loading method of the present invention.
Figure 13:
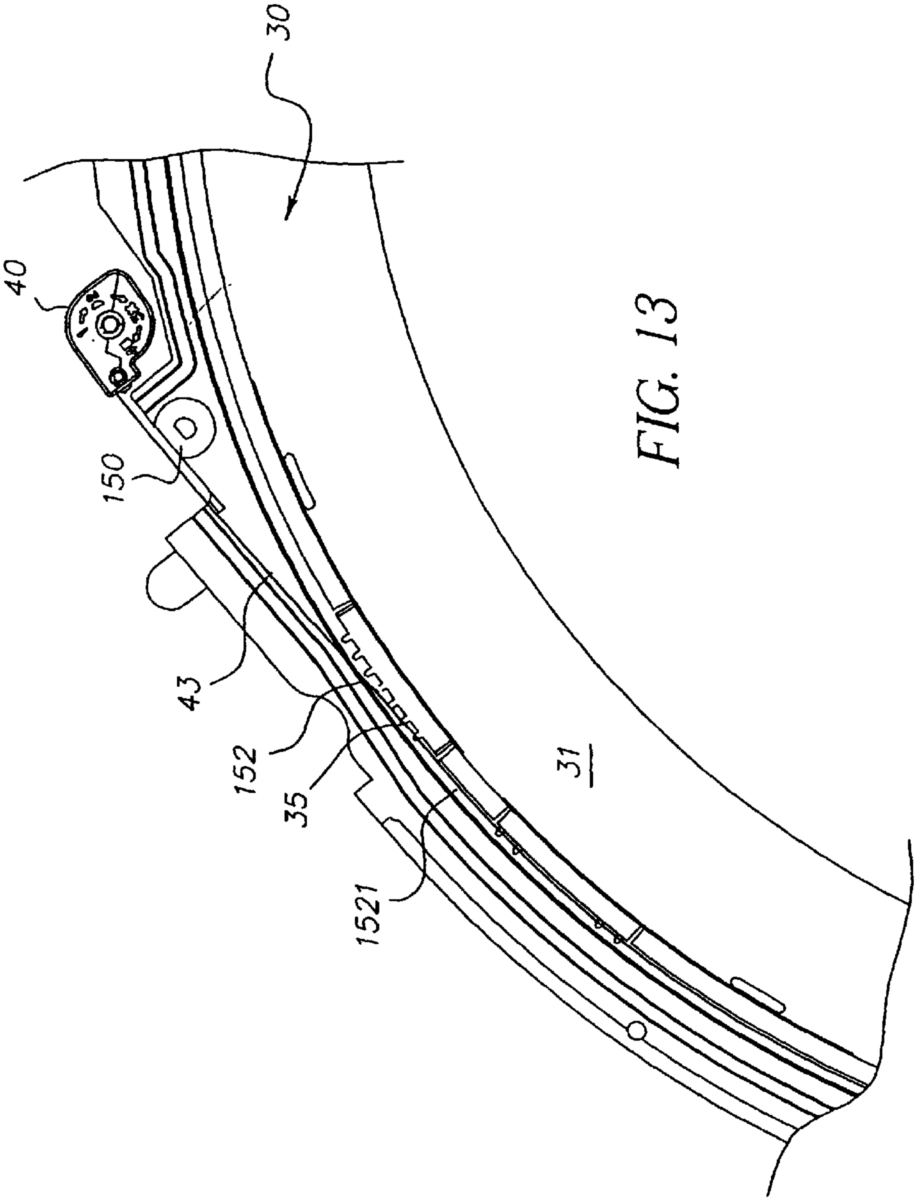
FIG. 13 depicts a cross-sectional view of film entering into a circular processing drum in one film-loading method of the present invention.

FIG. 12 shows a strip of film 43 exiting film cartridge 40 and entering film input slot 148 of circular processing drum 14. Driven nip rollers 150 grasp a leading edge of the strip of film 43 at drum roller nip point 151 and advance film 43 further into circular processing drum 14. As shown in FIG. 13, the strip of film 43 exits drum cavity slot 152 and enters into the drum processing cavity 1521 of circular processing drum 14, wherein one or more sets of disk teeth 35 on disk 30 interengage with holes or perforations along an edge of the strip of film 43. As previously described, disk teeth 35 could be spring loaded so as to spring up at the appropriate time and interengage with the holes or perforations along film 43. With clutch 250 disengaged, disk 30 and rollers 150 are rotated while circular processing drum 14 remains stationary. This causes film 43 to advance into the processing cavity 1521 of circular processing drum 14 a desired distance equal to the length of the strip or roll of film 43. As shown in FIGS. 10–13, in this film-loading method the film 43 remains intact with film cartridge 40.

A number of commercially available films may be loaded according to the film-loading method described above, namely, wherein the film remains intact with its corresponding film cartridge during processing. A suitable film, which may be used in this particular film-loading method, includes, but is not limited to, APS film. Desirably, APS film is loaded into the photographic processor of the present invention according to this method.

Figure 14:
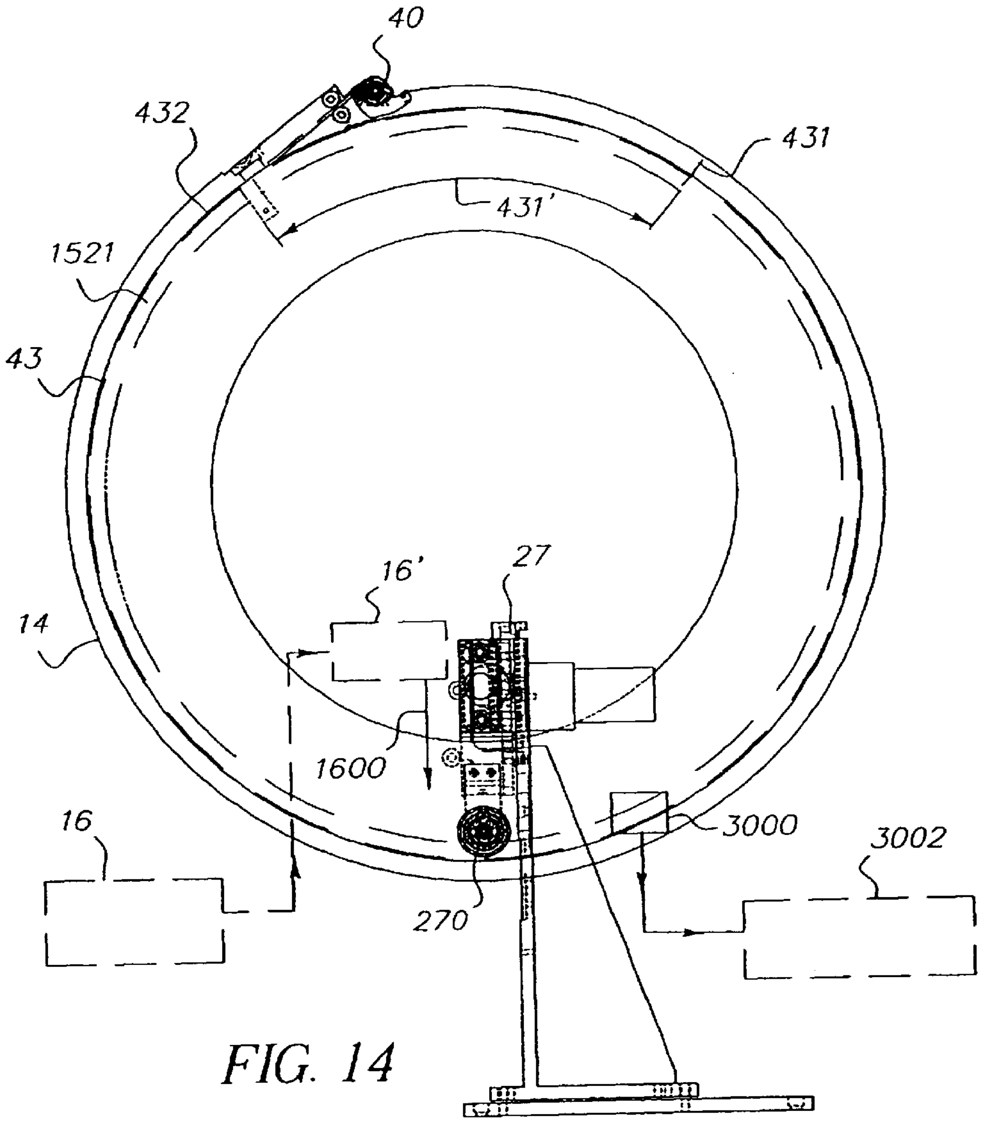
FIG. 14 depicts a sheet of film having a lead end and a tail end within the drum processing cavity of a circular processing drum.

FIG. 14 depicts circular processing drum 14 fully loaded with film 43 having a forward end 431 and a rearward end 432 within the drum processing cavity 1521 of circular processing drum 14. The back end of film 43 is maintained in cartridge 40. Film 43 is now positioned within circular processing drum 14 for chemical processing, wherein one or more processing fluids are deposited into circular processing drum 14 and placed in contact with film 43 for a desired period of time.

It is noted that the circumference of the drum will be longer than the length of the film to be processed. Therefore, when the film is loaded in drum 14, a section of drum 14 will not have film therein. This is referred to as a film-free zone 431' (FIG. 14). Prior to delivering chemistry by way of chemical supply 16 and a chemical delivery mechanism 16' (FIG. 14), clutch 250 is activated or engaged and drum 14 is controllably rotated with disk 30 so that film-free zone 431' is at a lower end or below chemical delivery mechanism 16'. Chemical delivery mechanism 16' is preferably of the type which drops or delivers chemistry into drum 14 in the direction of arrow 1600 (FIG. 14). The movement of film-free zone to an area below chemical delivery mechanism 16' prior to the delivery of chemicals prevents the chemicals from being dropped directly on the film which could cause uneven processing. Thereafter, processing occurs by continuously rotating the drum 14 and disk 30. Further, as shown in FIG. 14, in the lower portion of drum 14, film 43 passes between wheel 270 and an inner surface of drum 14. Rotation of drum 14 and disk 30 relative to wheel 270 helps to agitate the processing fluid in the vicinity of wheel 270 to promote processing. Drum 14 can be selectively rotated in a continuous or intermittent manner. Following the chemical processing steps, the film 43 is removed from circular processing drum 14 and exposed to a drying operation. One method of removing film 43 from circular processing drum 14 is shown in FIGS. 15A and 15B.

Figure 15A:
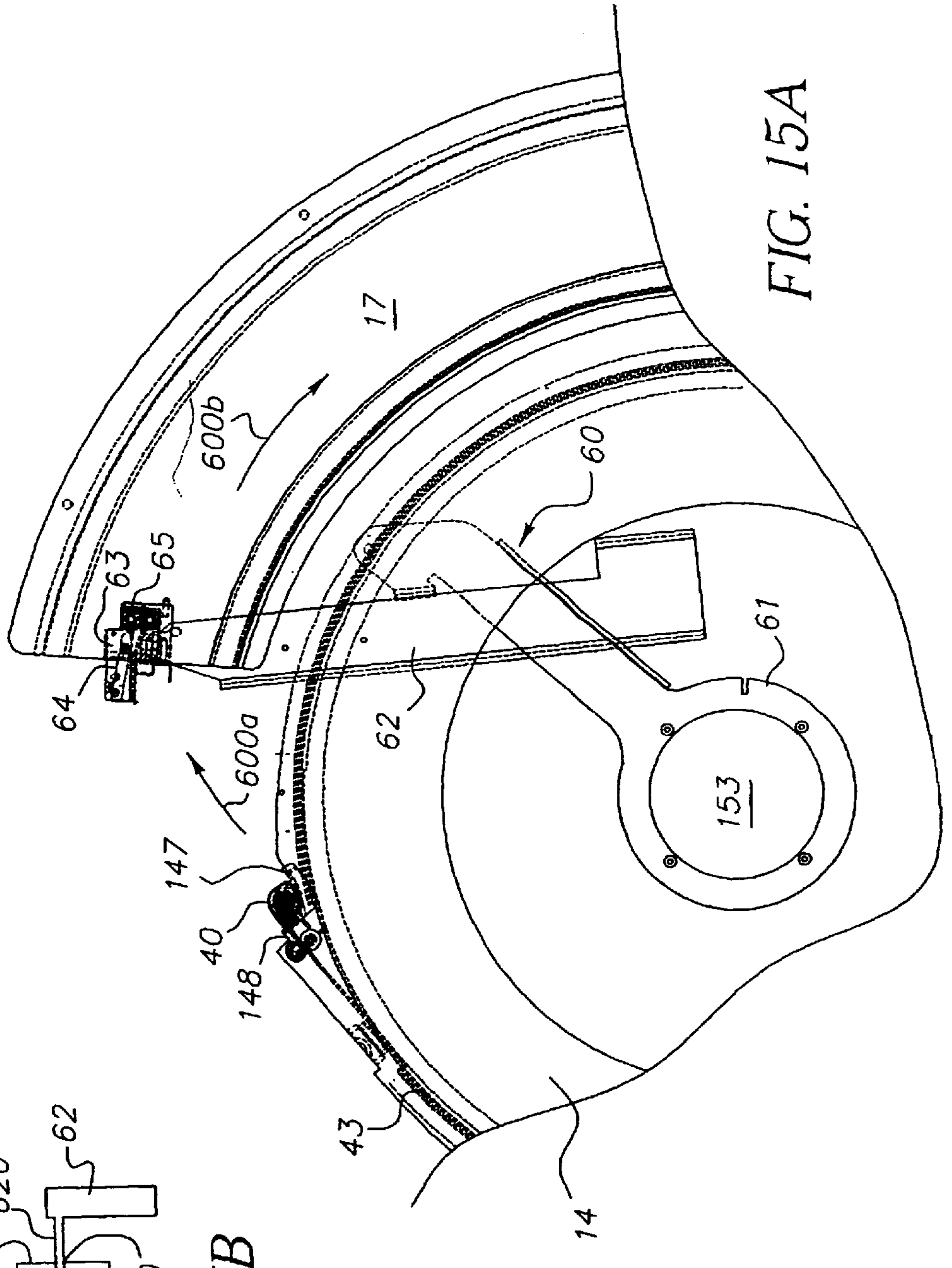
FIGS. 15A and 15B depicts an exemplary film transfer arm, which transfers film from a circular processing drum to a dryer.
Figure 15B:
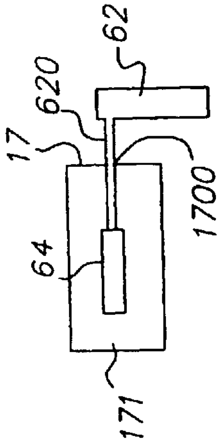

As shown in FIG. 15A, film transfer arm assembly 60 is positioned to move or pivot between circular processing drum 14 and dryer 17. Film transfer arm assembly 60 includes a lower arm member 61, which is rotatable around an axis of symmetry 153 of circular processing drum 14. Film transfer arm assembly 60 also includes an upper arm member 62, which is pivotally attached to lower arm member 61. At upper arm member end 63, film transfer arm assembly 60 includes a film cartridge gripper 64 and film strip gripper rolls 65. As shown in FIG. 15B, which is a front view of the entrance of dryer 17, a side wall of dryer 17 includes a slot 1700 with a rubber seal that extends along the length of the dryer. Upper arm member 62 includes a shaft 620 which extends from upper arm member 62, through slot 1700 and is connected to gripper 64. This permits transfer arm assembly 60 to pull gripper 64 and thus the film to be dried though the dryer.

In embodiments wherein the film 43 remains intact with film cartridge 40 (as described above), film cartridge gripper 64 of film transfer arm assembly 60 engages with film cartridge 40, pulls film cartridge 40 from loading area 147 and the strip of film 43 from circular processing drum 14 in direction 600*a*, and proceeds through dryer 17 in direction 600*b*. Therefore, cartridge 40 with processed film 43 attached and trailing therefrom is conveyed through dryer 17 to dry film 43 by, for example, the blowing of air into dryer 17. In other embodiments where the film 43 is detached from film cartridge 40 (described below), film sheet gripper rolls 65 grip an edge of film 43 as film 43 exits film input slot 148 of circular processing drum 14. Film sheet gripper rolls 65 of film transfer arm assembly 60 pull film 43 from circular processing drum 14 and proceeds through dryer 17. Once dried, film 43 is re-wound back into its cartridge 40 prior to proceeding to scanner 18'.

Figure 16:
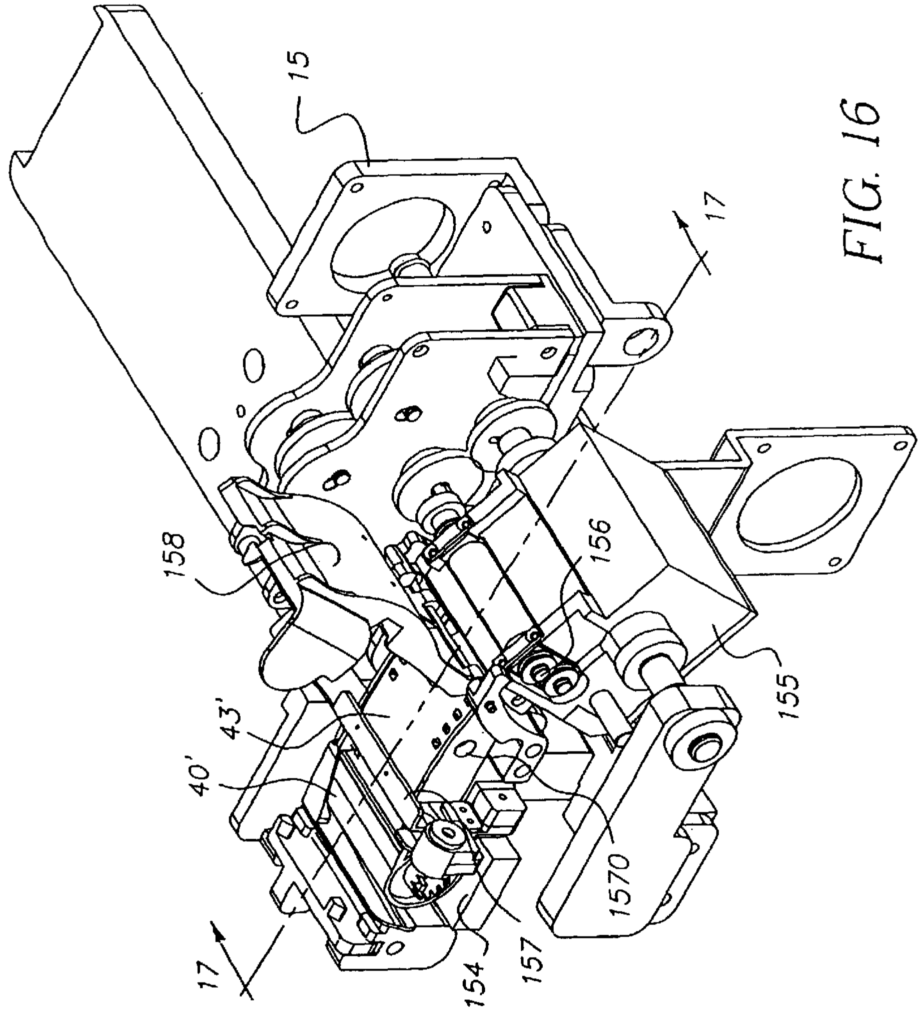
FIG. 16 depicts an exemplary film loading/unloading device used in a film-loading method of the present invention wherein film is separated from its corresponding film cartridge.

In a further film-loading method, the film is separated from its film cartridge prior to processing within circular processing drum 14 (for example, 35 mm film). In this method, a film loading/unloading device, such as exemplary film loading/unloading device 15 as shown in FIG. 16, may be used. Film loading/unloading device 15 includes a film cartridge loading area 154, which can be enclosed by closing a door 158. In film loading area 154, an operator extracts the tongue of film 43' from cartridge 40' and engages the perforations on film 43' with sprockets on a driven roller 1570. Thereafter door 158 is closed and film 43' proceeds into festoon box 155 through festoon box nip rollers 156. Once a desired length of film is removed from film cartridge 40', a cutter 157 slices film 43' to separate film 43' from film cartridge 40'. Any counter device (not shown) may be used to measure the length of the strip of film 43' passing through festoon box nip rollers 156. The length measurement is used in further processing steps as described below.

Figure 17:
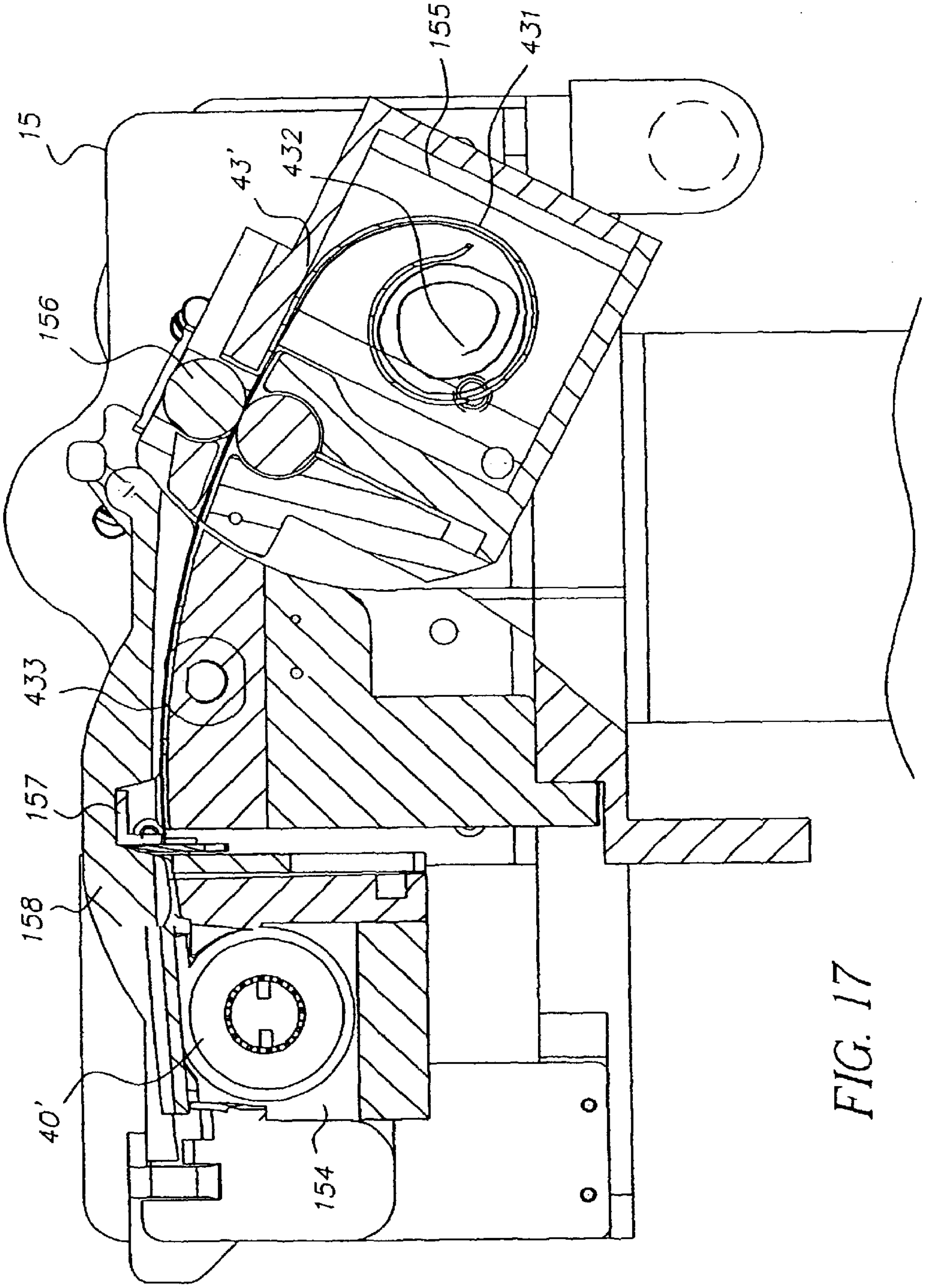
FIG. 17 depicts a cross-sectional view of the exemplary film loading/unloading device as seen along line B—B in FIG. 16.

FIG. 17 depicts a cross-sectional view of film loading/unloading device 15 as seen along line 17—17 in FIG. 16. As shown in FIG. 17, film cartridge 40' is positioned in film cartridge loading area 154 while a strip of film 43' is removed from film cartridge 40' and transported to festoon box 155 where it is turned. In this film-loading operation, a reverse roll of film 431 is formed from the film 43' in festoon box 155. A lead end of film 432 becomes the innermost portion of the reverse roll 431 while a tail end of film 433 becomes the outermost portion of reversed roll 431. When the film 43' is subsequently fed into circular processing drum 14 (as previously described), tail end 433, which contains the last exposures on the strip of film 43', is fed into circular processing drum 14 first.

Figure 18:
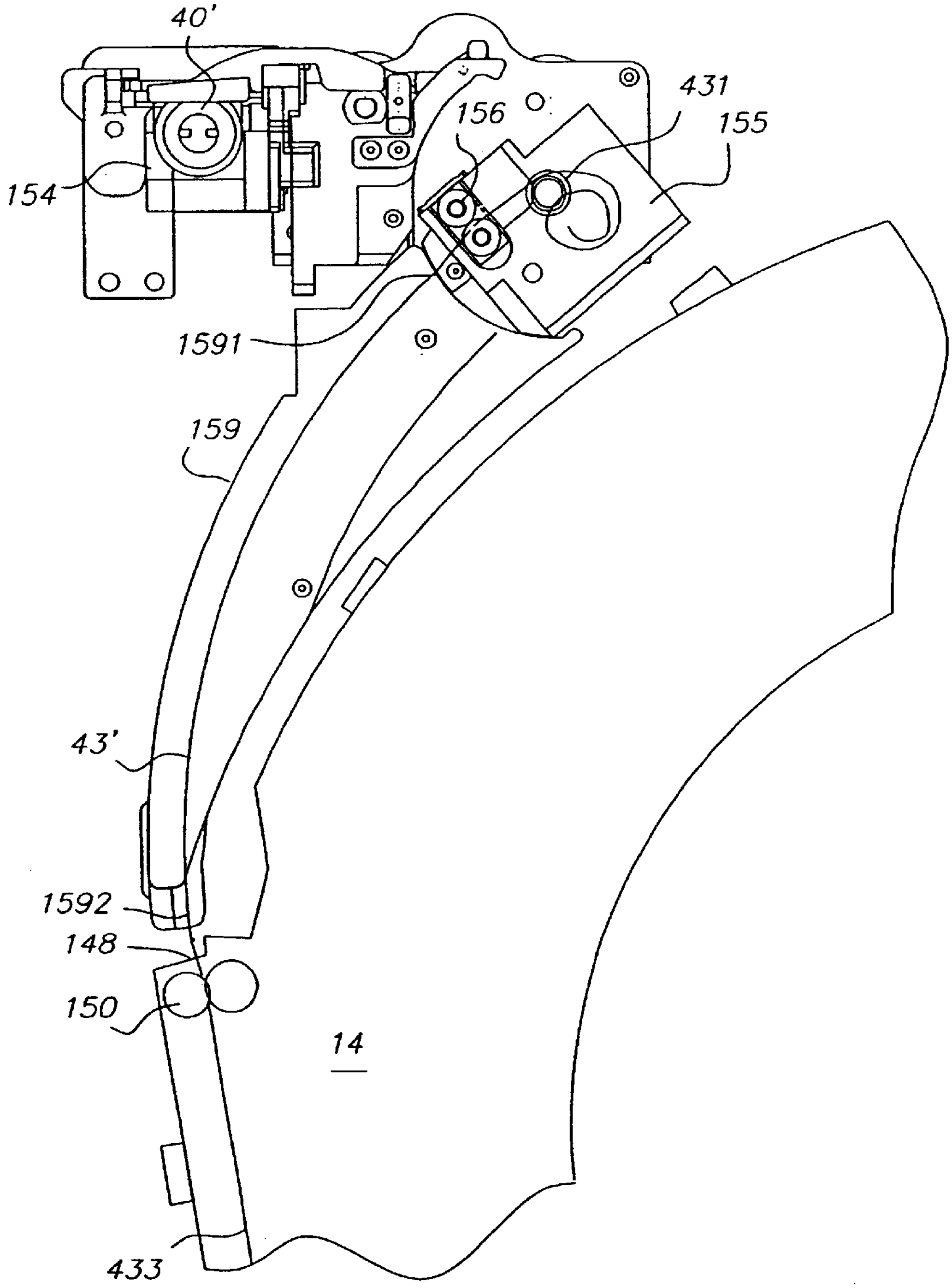
FIG. 18 depicts an exemplary film-loading guide used to load a film roll into a circular processing drum.

A film-loading guide 159 is used to load reverse roll 431 into circular processing drum 14 as shown in FIG. 18. Festoon box 155 rotates from an initial position (as shown in FIGS. 16 and 17) to a film-loading position as shown in FIG. 18. Festoon box nip rollers 156 turn to advance tail end 433 of reverse roll 431 into film-loading guide 159 at guide entrance slot 1591. The film 43' exits the film-loading guide 159 at guide exit slot 1592 positioned adjacent to film input slot 148 of circular processing drum 14. Once the tail end 433 of the strip of film 43' enters into circular processing drum 14, driven nip rollers 150 grab the film 43' and advance the film 43' into circular processing drum 14 as described above. It should be noted that in this film-loading method, nip rollers 150 are programmed to advance the film.43' into circular processing drum 14 a specific length, which corresponds to the length of film inputted into festoon box 155 and measured via festoon box nip rollers 156 as described above. In other words, nip rollers 150 advance the strip of film 43' into circular processing drum 14 so that lead end 432 of film 43' remains nipped between nip rollers 150 during chemical processing (i.e., lead end 432 of the strip of film 43' does not enter into drum processing cavity 1521). This permits all of the exposed areas of the film 43' to be in the processing area in the drum.

Figure 19:
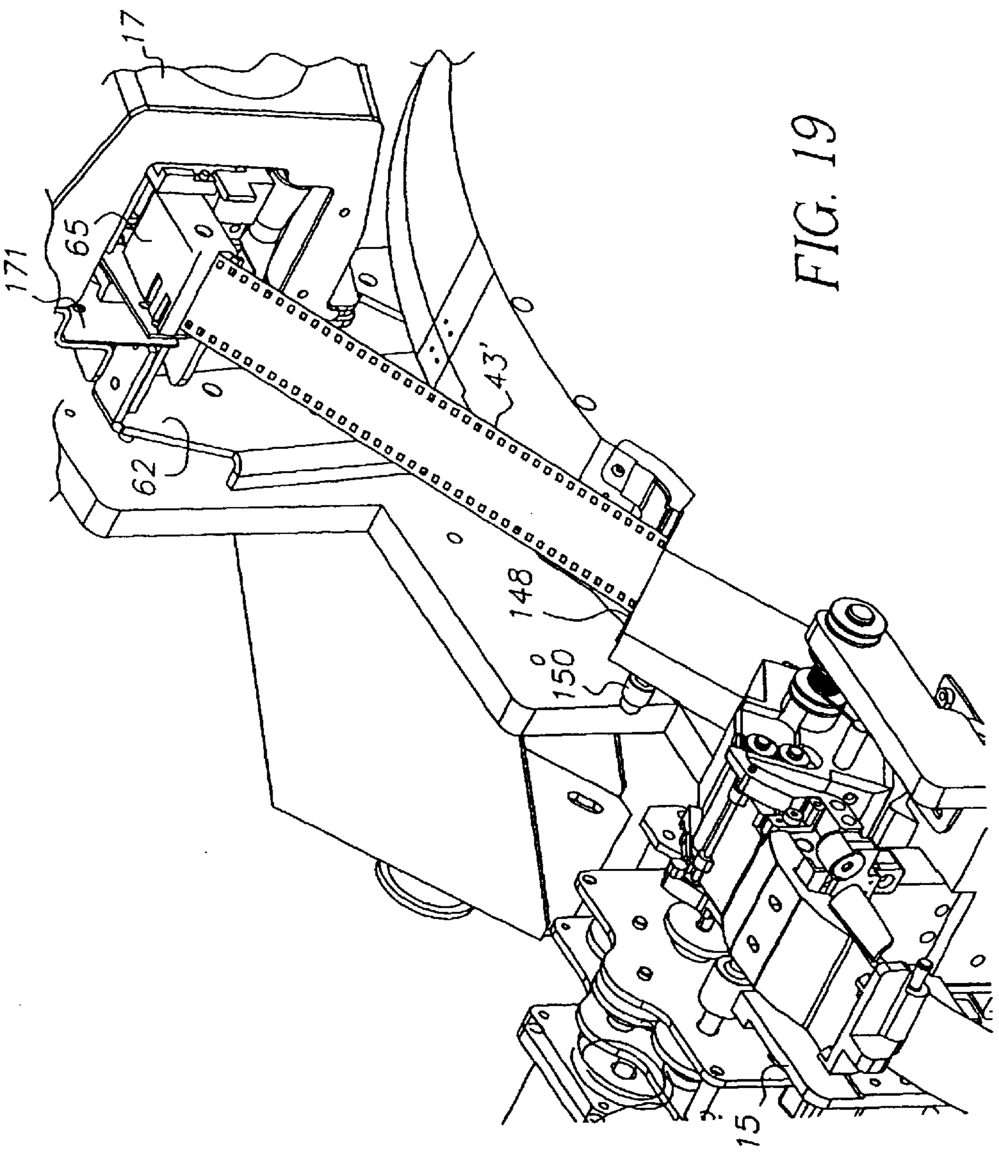
FIG. 19 depicts a film transfer step, wherein a strip of film is transferred from a circular processing drum to a dryer by film sheet gripper rolls attached to a film transfer arm.
Figure 20:
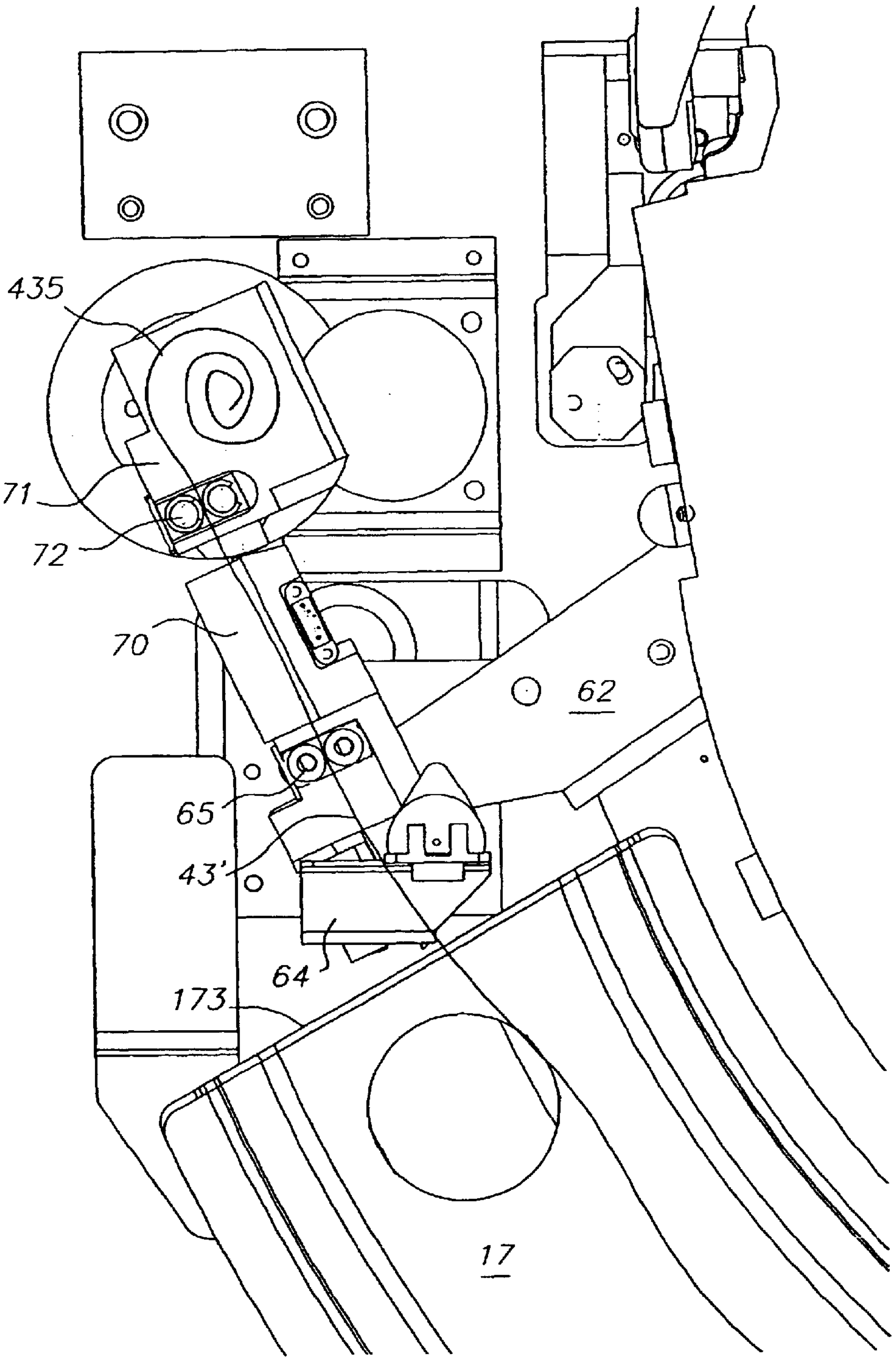
FIG. 20 depicts a film processing step, wherein a strip of film exits a dryer into a scanner festoon box.

Following the chemical processing steps, film 43' is transferred to dryer 17 by film transfer arm assembly 60 as described above. As shown in FIG. 19, the strip of film 43' is pulled from circular processing drum 14 through film input slot 148 by film sheet gripper rolls 65 attached to upper transfer arm member 62. Nip rollers 150 provide a first end (corresponding to lead end 432) to film sheet gripper rolls 65. In FIG. 19, film sheet gripper rolls 65 are shown positioned at dryer entrance 171. From this position, film sheet gripper rolls 65 proceed through dryer 17 pulling the film 43' through dryer 17. As shown in FIG. 20, upper film transfer arm member 62 exits dryer 17 at dryer exit 173 and comes into contact with a conduit 70. Film sheet gripper rolls 65 turn to advance the film 43' through conduit 70 and into scanner festoon box 71. Scanner festoon box nip rollers 72 grasp a leading edge of film 43' and force film 43' into scanner festoon box 71 forming scanner film roll 435. Scanner festoon box nip rollers 72 advance film 43' into scanner festoon box 71 a specific distance equal to the predetermined length of film 43' so that the tail end of film 43' remains nipped between scanner festoon box nip rollers 72 to go to the scanner.

Figure 21:
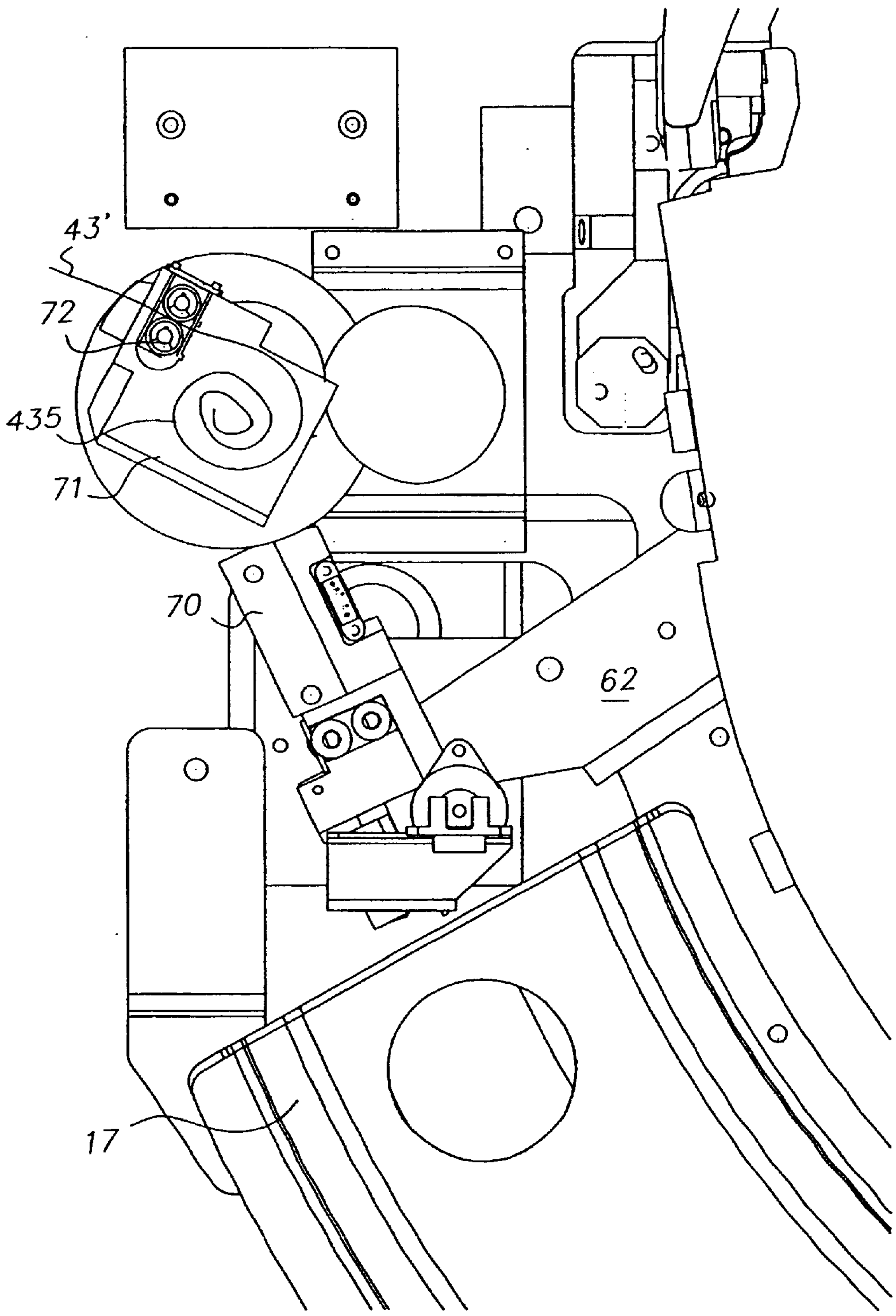
FIG. 21 depicts a film processing step, wherein a strip of film exits a festoon box and proceeds to a scanner.

In one embodiment, film 43' may be further processed by transporting the film 43' to scanner 18'. As shown in FIG. 21, scanner festoon box 71 rotates from an initial position (as shown in FIG. 20) to a secondary position so that the film 43' may be fed to scanner 18'. Scanner 18' may supply image data to computer 2000 or a remote computer (not shown) for further image processing. Following scanning, the film 43' may be packaged as a film roll or as strips of film and returned to the customer along with scanned photographs in electronic format on an electronic disc if desired.

A number of commercially available films may be loaded according to the film-loading method described above, namely, wherein the film is separated from its corresponding film cartridge during processing. Suitable films, which may be used in this particular film-loading method, include, but are not limited to, 135 mm film. Desirably, 135 mm film is loaded into the photographic processor of the present invention according to this method.

The photographic processor as described may be used to process one or more types of film. Suitable films include, but are not limited to, APS film, 135 mm film, etc. Desirably, the photographic processor is designed to process APS film, 135 mm film, or both APS and 135 mm film. However, the invention is not limited to APS and 135 mm film and it is recognized that other types of film such as 120 format and 110 format can also be processed in the processor of the present invention. The photographic processor may be categorized as a "single-roll", "single use" or "batch" processor given that the circular processing drum only chemically processes one roll of film at a time.

The photographic processor as described may include other components other than those described in FIGS. 1–21. For example, the photographic processor may include an operator interface control panel operationally associated with computer 2000 (FIG. 1); a display screen; a control unit, wherein the control unit accepts input from a processor user, provides machine settings to one or more components of the processor based on the input of the user, and controls and executes a processing operation of the processor; and multiple film loading doors on an outer surface of the photographic processor housing. In one desired embodiment, the photographic processor is used to process APS film and 135 mm film. In this embodiment, the photographic processor has two separate film loading doors on an outer surface of the photographic processor housing, one for an APS film cartridge and the other for a 135 mm film cartridge.

The photographic processor as described may use any conventional chemical delivery system known in the art as long as the chemical delivery system is capable of inputting one or more processing fluids into the circular processing drum. Suitable chemical delivery systems deliver one or more processing fluids including, but not limited to, a developing solution, a bleach solution, a fix solution, a wash solution, a combination or a concentrate thereof. Desirably, the chemical delivery system comprises one or more separate containers for each of the processing fluids. For example, the chemical delivery system may comprise one or more separate containers containing a developing solution, one or more separate containers containing a bleach solution, one or more separate containers containing a fix solution, and one or more separate containers containing a wash solution. In one embodiment of the present invention, the chemical delivery system used in the photographic processor comprises one container of developing solution, one container of bleach solution, one container of fix solution, and at least one container of wash solution.

Desirably, the photographic processor of the present invention utilizes a chemical delivery system comprising "working strength" chemical solutions. As used herein, the term "working strength" is used to describe chemical solutions, which are prepackaged in separate containers at concentrations that do not require dilution with other solutions (i.e., a source of water), and can be used as is. The system can very easily work with concentrates that are measured, diluted and heated on board. They can be diluted with water (if a supply is available) or with a simple rinsing solution that contains water and a surfactant.

Further, the photographic processor as described may use any conventional chemical removal system to remove or discard one or more processing fluids from the circular processing drum. Suitable chemical removal systems include, but are not limited to, a suction device or a drain 3000 (FIG. 14) in the side wall of the circular processing drum. Typically, the chemical removal system further comprises a chemical waste reservoir 3002 (FIG. 14) for storing one or more processing fluids removed from the drum. Desirably, the chemical waste reservoir is designed to contain all of the waste resulting from the use of all of the processing fluids contained in the chemical delivery system.

Figure 22B:
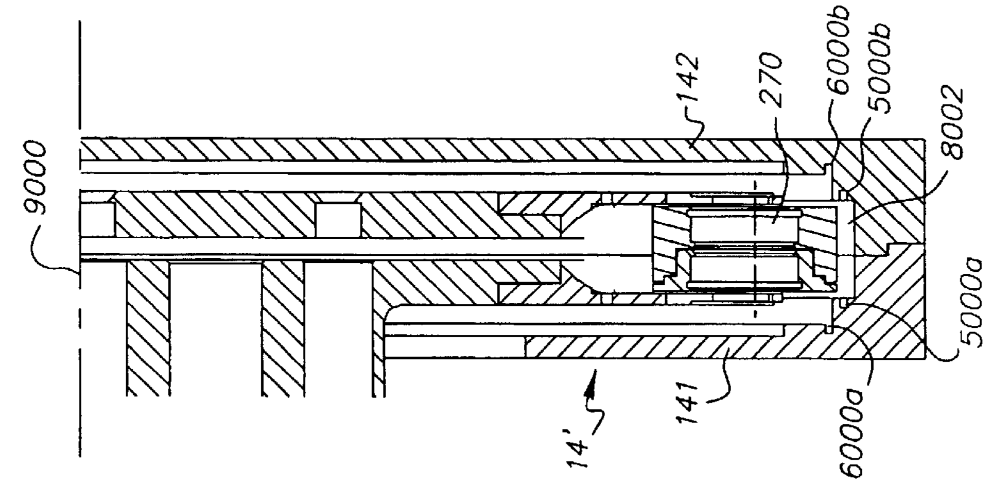
FIGS. 22A and 22B are cross-sectional views of a processing drum having dual grooves in accordance with the present invention.
Figure 22A:
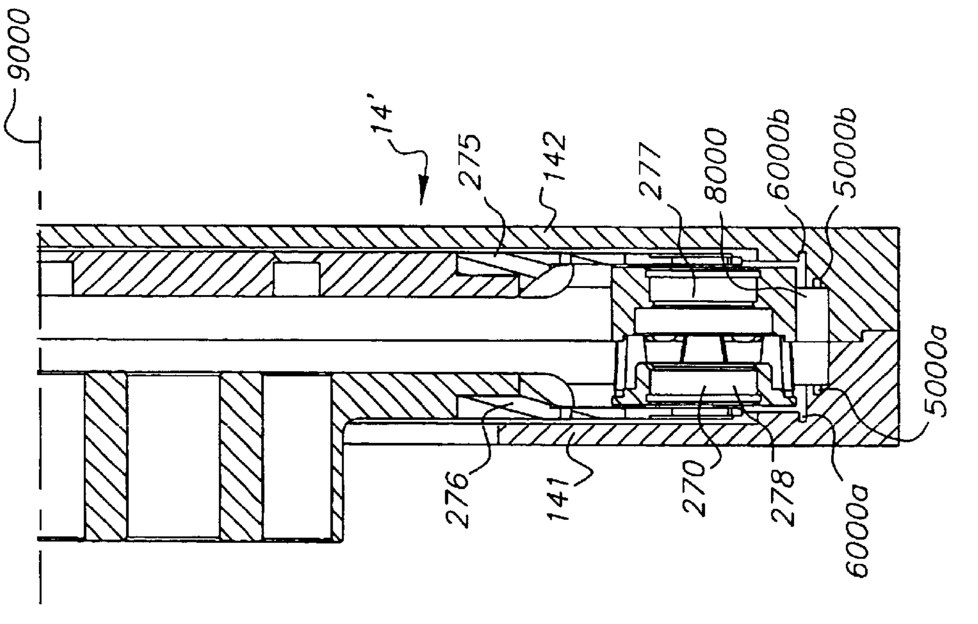

FIGS. 22A and 22B illustrates a further embodiment of a processing drum in accordance with the present invention. With reference to FIG. 22A, circular processing drum 14', as well as first wall 141 and opposing second wall 142 which define a portion of processing drum 14' are shown. In the embodiment of FIGS. 22A and 22B, disk 30 is not utilized. That is, as shown in FIG. 22A, each of walls 141 and 142 includes grooves therein which are positioned to receive and guide the edges of media such as photographic film. More specifically, wall 141 includes a first groove 6000*a* which opposes a second groove 6000*b* formed in wall 142. Grooves 6000*a* and 6000*b* form a part of a first curved path 8000 for processing a first type of media having a first width. More specifically, when a first type of media having a first width is desired to be processed, opposing edges of the first type of media such as, for example, 35 mm film, can be inserted into opposing grooves 6000*a*, 6000*b* of processing drum 14'.

Processing drum 14' further includes a third groove 5000*a* in wall 141 and fourth groove 5000*b* in wall 142 which opposes third groove 5000*a*. Opposing grooves 5000*a*, 5000*b* form part of a second curved path 8002 for processing a second type of media having a second width which is smaller than the first width. More specifically, when media of a second type having a second width is desired to be processed, the media of the second type such as, for example, APS film can be inserted in a manner in which the edges of the film are inserted into opposing grooves 5000*a*, 5000*b*. As shown in FIGS. 22A and 22B, the combination of grooves 5000*a*, 5000*b* define a shorter width for media such as APS film, while opposing grooves 6000*a*, 6000*b* define a larger width for media such as 35 mm film.

As also shown in FIGS. 22A, 22B and described with respect to the previous embodiment, processing drum 14' further includes agitating roller 270 which comprises interengaging members 277 and 278 (also referred to herein as a first roller member 277 and second roller member 278).

As described with reference to FIG. 7, during use, film passes between roller 270 and an interior surface of drum 14'. Roller members 277, 278 which make up roller 270 are freely rotatable and maintain the film flat along the lower portion of drum 14'. Roller members 277, 278 further provide an agitating feature within processing drum 14' during processing by rotating within the processing solution as the film passes along the film path. As also described with reference to FIG. 7, the width of roller 270 is adjustable to accommodate shorter width film and larger width film, and can further be vertically adjustable to accommodate for film curl as the film passes between roller 270 and the interior surface of drum 14'. As a still further option, roller 270 can be spring loaded so as to accommodate any variation in the interior surface of drum 14'.

Figure 23A:
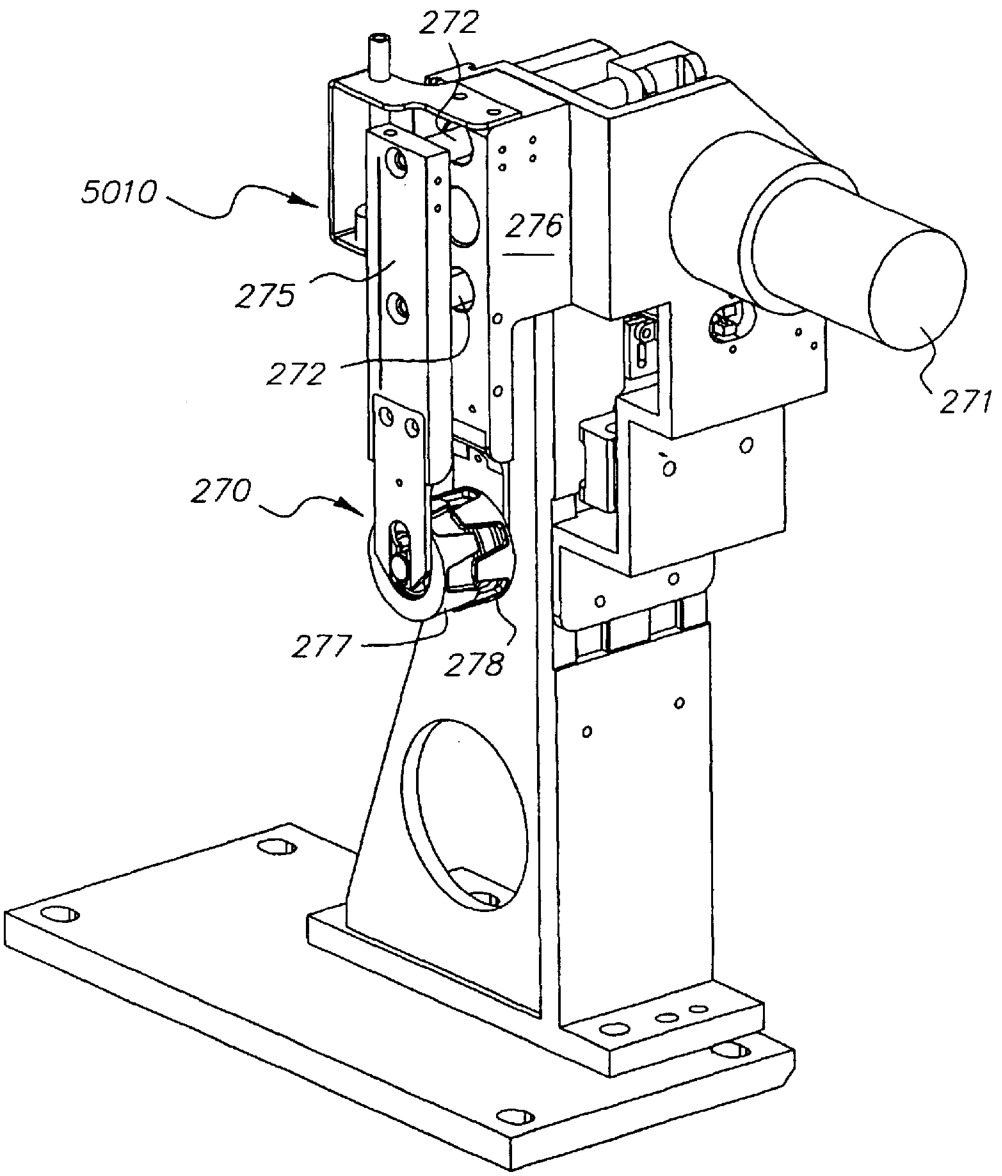
FIGS. 23A and 23B are views of an agitating roller of the drum of FIGS. 22A and 22B, wherein the drum is not illustrated for clarity purposes.
Figure 23B:
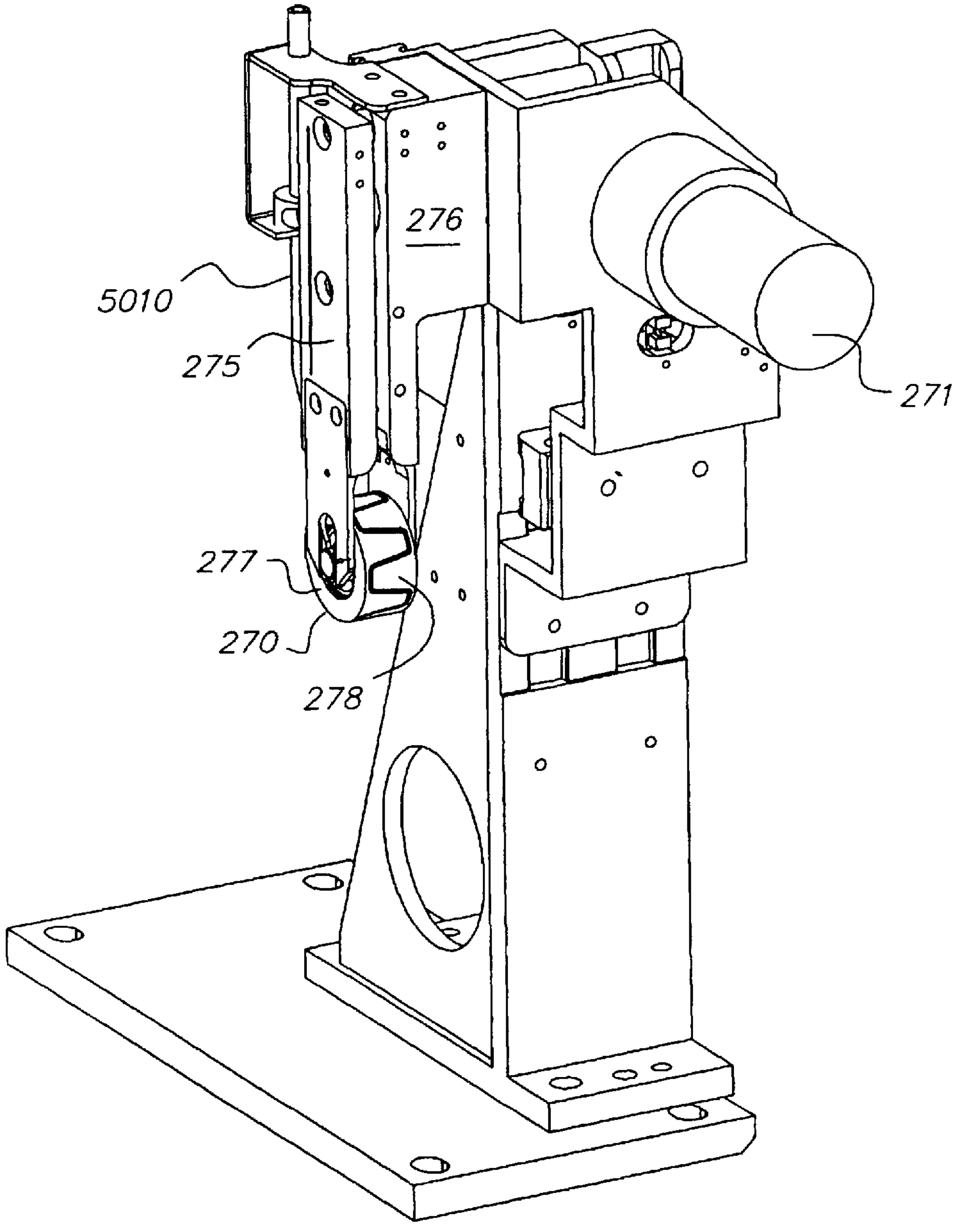

In a feature of the present invention, when it is desired to process a larger width media such as, for example, 35 mm film, agitating roller 270 is placed in the position illustrated in the FIG. 22A. More specifically, and with reference to FIG. 23A which illustrates agitating roller 270 mounted on support assembly 5010, motor 271 is adapted to provide motion to pistons or shafts 272 which moves first part or member 275 with respect to or relative to second part or member 276. This provides corresponding movement to roller members 277, 278 to permit roller 270 to be expandable between a first width when members 277 and 278 overlap each other by a first amount as shown in FIG. 23B, and a second width larger than the first width, when members 277 and 278 move away from each other so as to overlap each other by a second amount less than the first amount or not at all as shown in FIG. 23A. The mechanism for moving roller 270 between the larger width state and the shorter width state could be any one of a variety of movement mechanisms such as gears, cams, belts, pneumatics or a combination thereof.

Figure 23C:
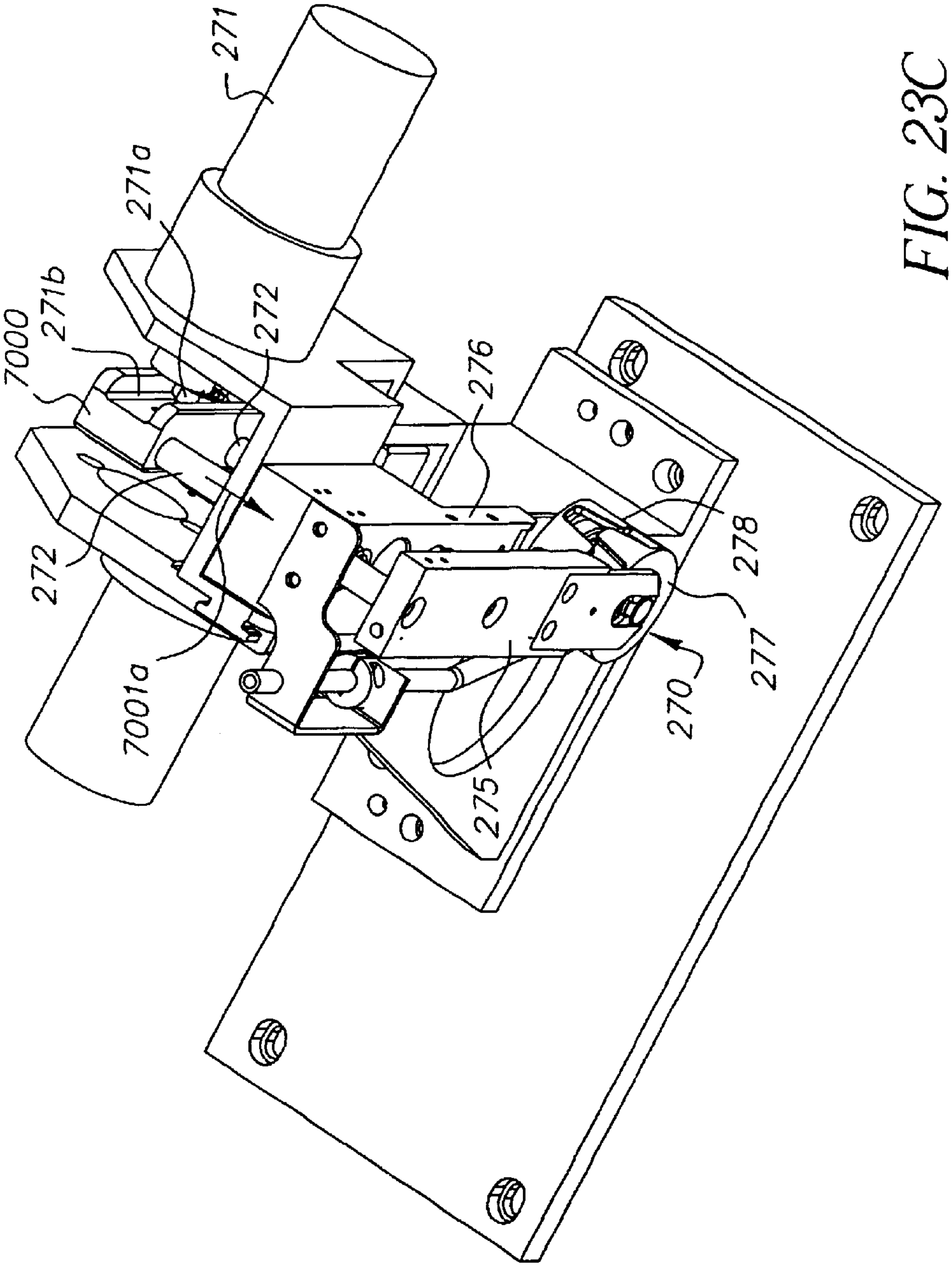
FIGS. 23C–23G are different views of the agitating roller in different positions.
Figure 23D:
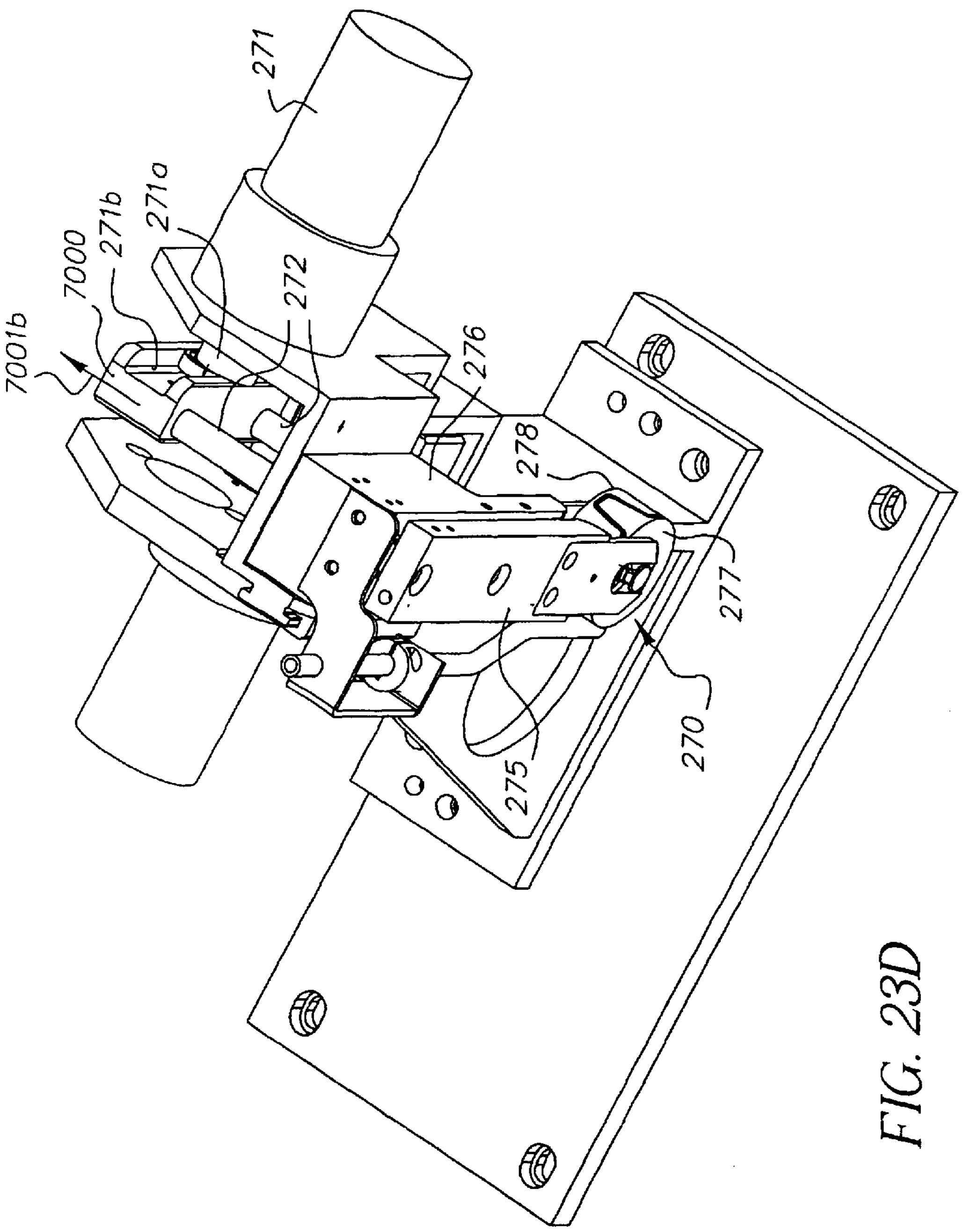

An example of a mechanism for moving roller 270 between the larger width state and the shorter width state is illustrated in FIGS. 23C and 23D. As shown in these drawings, motor 271 could be attached to an eccentrically mounted cam 271 a which rotates about a center axis of motor 271 upon actuation of motor 271. Cam 271*a* is fitted within an opening 271*b* of a plate member 7000. Plate member 7000 is attached to at least pistons 272. Therefore, upon actuation of motor 271, cam 271*a* is moved so as to be located at a first position illustrated in FIG. 23C. This movement of cam 271*a* causes plate member 7000 to be moved in direction 7001*a*. Movement of plate member 7000 in direction 7001*a* causes a corresponding movement of pistons 272 in the same direction. This movement of pistons 272 causes member 275 to move away from member 276, which causes roller member 277 to move a corresponding amount relative to roller member 278 to provide for the wide width state of roller 270 as shown in FIGS. 23A and 23C.

When it is desired to place roller 270 in the shorter width state, motor 271 is actuated to rotate or locate cam 271*a* in the position shown in FIG. 23D. This causes a movement of plate member 7000 in an opposite direction (direction 7001*b*). Movement of plate member 7000 in direction 7001*b* causes a corresponding movement of pistons 272 in the same direction. This movement of pistons 272 causes a movement of member 275 in a direction toward member 276 which results in the movement of roller member 277 toward roller member 278 to provide for the shorter width state shown in FIGS. 23B and 23D.

The above description with respect to FIGS. 23C and 23D is only one example for moving roller members 277 and 278 to achieve the shorter and longer width states. It is realized that numerous types of moving mechanisms can be utilized to achieve the noted movement, and therefore, the present invention is not limited to the example shown. For example, motor 271 can drive pistons 272 via a gear drive, a screw gear, a belt drive, a pneumatic drive or a combination thereof.

Figure 23E:
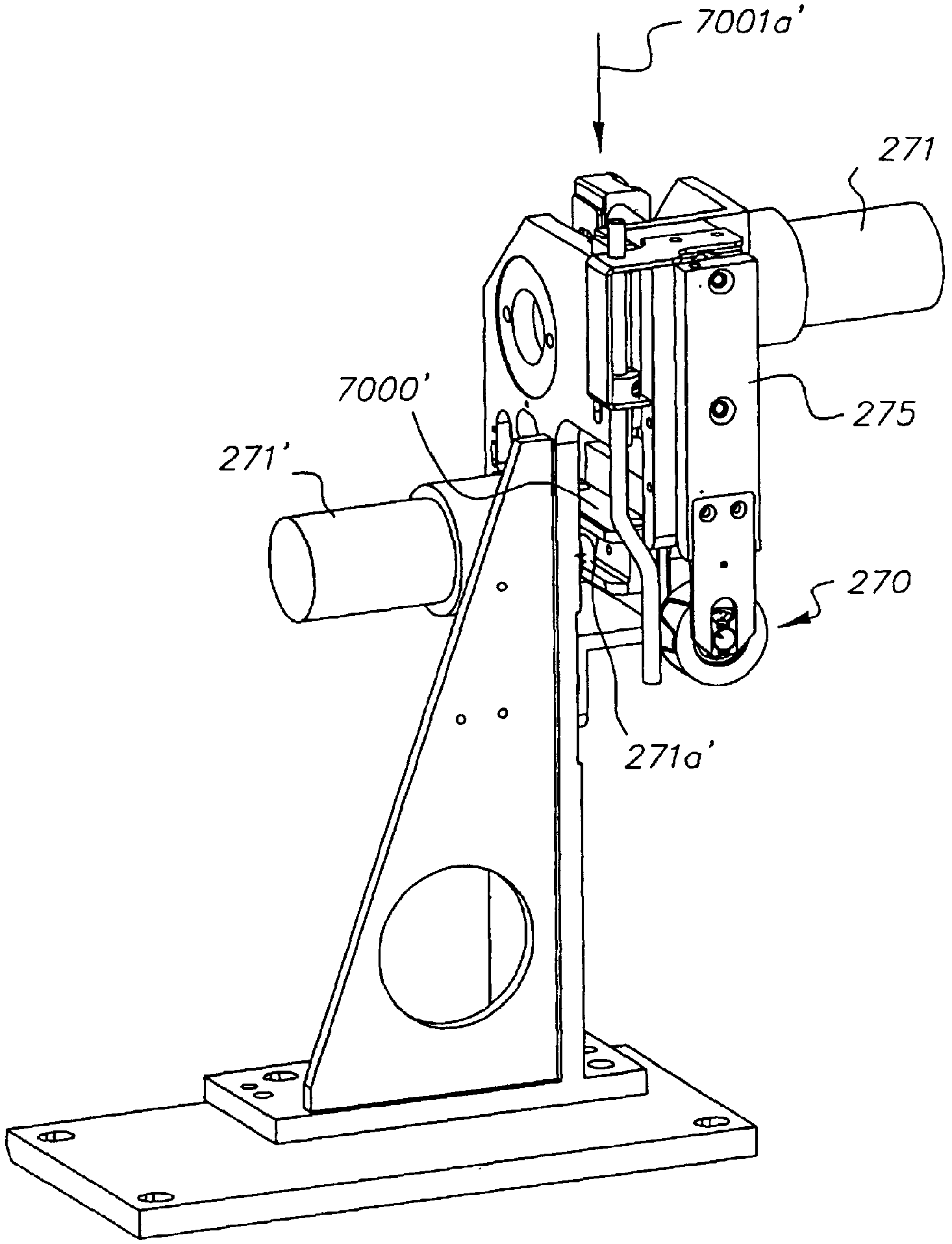
Figure 23F:
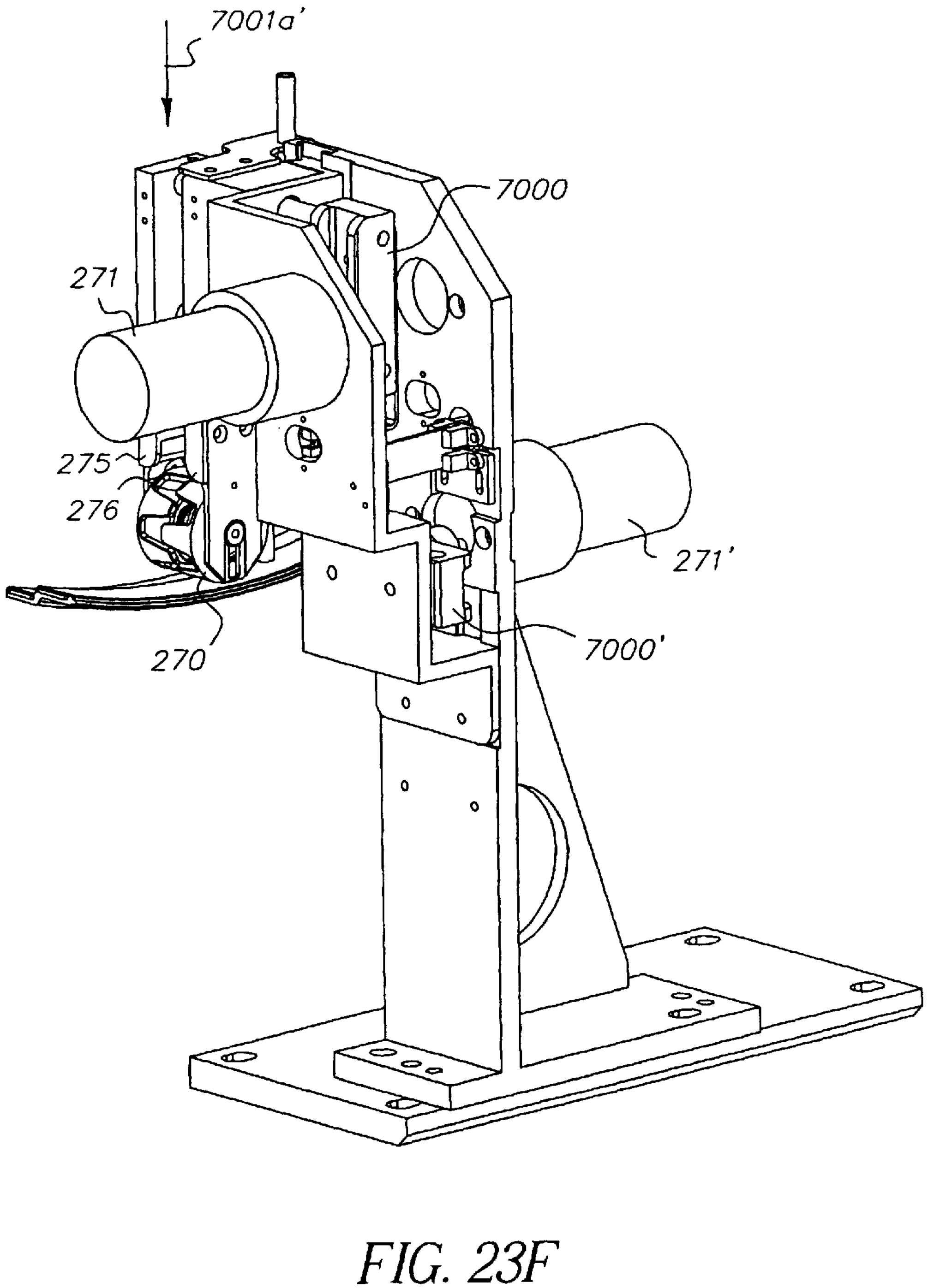
Figure 23G:
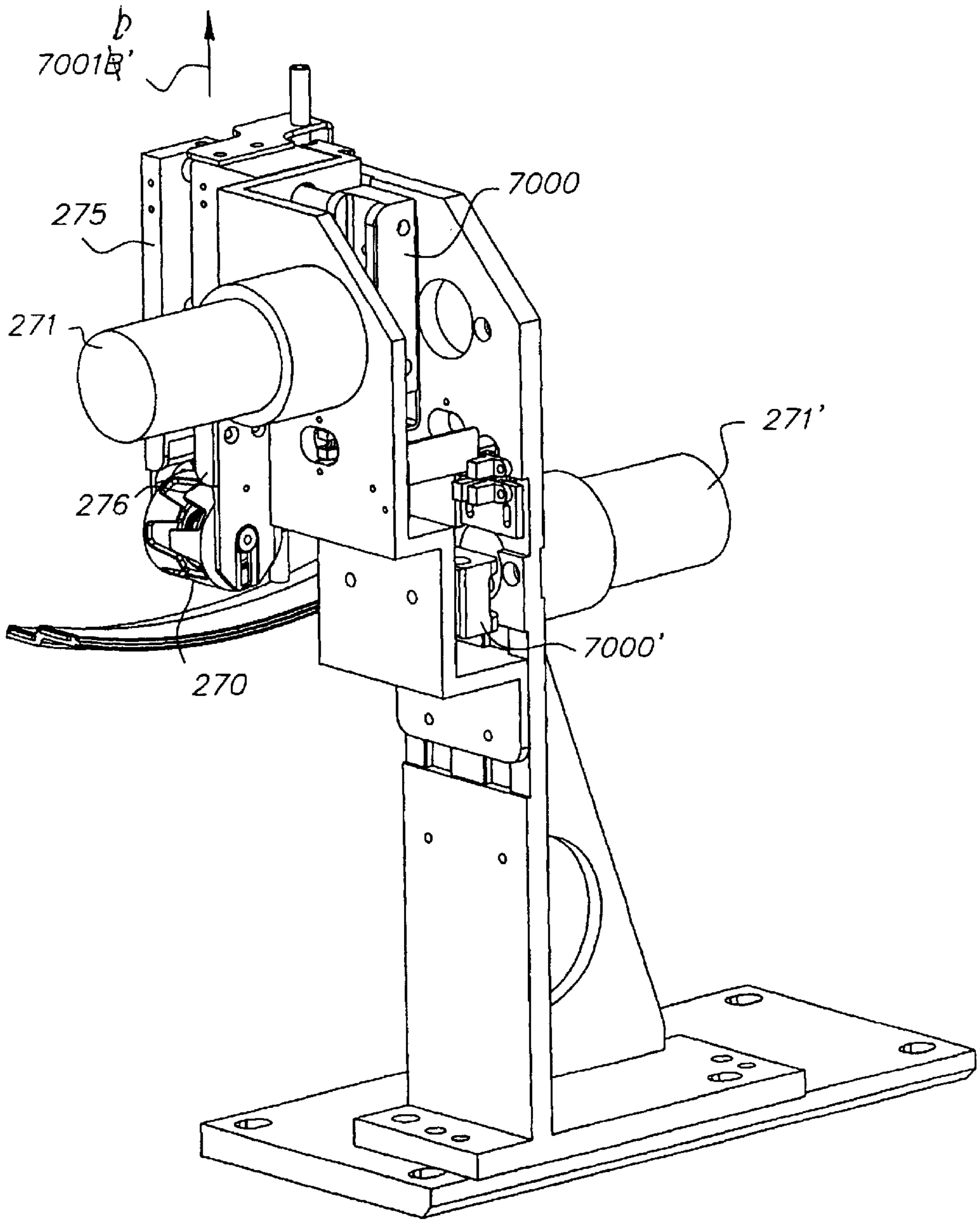

Further, as also shown in FIGS. 23E, 23F and 23G, roller 270 is adapted to be moved up and down in response to, for example, the actuation of a motor. The mechanism for moving roller 270 in a vertical direction could be any one of a variety of movement mechanism such as gears, cams, belts, pneumatics or a combination thereof.

FIGS. 23E, 23F and 23G illustrate one example for moving roller 270 vertically or up and down. As shown in FIG. 23E, a further motor 271' is attached to an eccentrically mounted cam 271*a'* which is adapted to rotate about a center axis of motor 271' upon rotation of motor 271'. Cam 271*a'* is fitted within a plate member 7000' in a manner similar to the arrangement of FIGS. 23C and 23D. Plate 7000' is attached to at least member 276 which is attached to member 275. As previously described, members 275 and 276 are respectively attached to roller members 277 and 278. Therefore, upon actuation of motor 271', cam 271*a* is located at a first position illustrated in FIG. 23E and FIG. 23F. This movement of cam 271*a*' causes plate member 7000' to move in direction 7001*a*' which causes a corresponding movement of members 276 and 275 and therefore roller 270 in direction 7001*a*'. This provides for the placement of roller 270 in the lower position as shown in FIG. 22B, FIG. 23E and FIG. 23F.

When it is desired to place roller 270 in an upper position as shown in FIG. 22A, motor 271' is rotated to place cam 271*a*' in a second position. The movement of cam 271*a*' causes a movement of plate member 7000' in an opposite direction (direction 7001*b*') as shown in FIG. 23G. Movement of plate member 7000' in direction 7001*b*' causes a corresponding movement of members 275, 276 and therefore roller 270 in direction 7001*b*' to the position illustrated in FIG. 23G. This provides for the upper position of roller 270.

The above description with respect to FIGS. 23E, 23F and 23G is only one example for moving roller 270 up and down. It is realized that numerous types of moving mechanisms can be utilized to achieve the noted movements and therefore, the present invention is not limited to the example shown. For example, motor 271' can drive roller 270 via a gear drive, a screw gear, a belt drive, a pneumatic drive or a combination thereof.

Further, the above movements of roller 270 between a shorter width state and a longer width state, and between the upper position and the lower piston, can be achieved through the use of a single motor. That is, a single motor can be interengaged with a drive that places roller 270 in the shorter width state while moving roller 270 to the lower position as shown in FIG. 22B; and also places roller 270 in the larger width state while moving roller 270 to the upper position illustrated in FIG. 22A.

The movement of roller 270 in a vertical direction permits roller 270 to be moved between the position illustrated in FIG. 22A for processing larger width media which passes within grooves 6000*a*, 6000*b*, and the position illustrated in FIG. 22B for processing smaller width media which passes between grooves 5000*a*, 5000*b*.

More specifically, when it is desired to process larger width media such as 35 mm film as noted above, motor 271 is controllable so as to adjust the width of agitating roller 270 to a state which is a larger width state suitable for 35 mm film as shown in FIGS. 22A and 23A. Thus, as shown in FIG. 22A, the combination of roller 270, groove 6000*a* and groove 6000*b* define first processing path 8000 for media of a first type. It is noted that each of grooves 6000*a* and 6000*b*, path 8000 defined by grooves 6000*a*, 6000*b*, and roller 270 are closer to rotational or center axis 9000 of drum 14' than grooves 5000*a*, 5000*b*.

When it is desired to process media of a second type and more specifically, a shorter width media such as APS film, roller 270 is placed in a second position and more specifically, a position which is closer to the inside peripheral surface of drum 14' as shown in FIG. 22B. In this second position, roller 270 essentially blocks off grooves 6000*a*, 6000*b*, and forms second processing path 8002 (FIG. 22B) which is defined by the combination of roller 270, groove 5000*a* and groove 5000*b*. As also shown in FIG. 22B, since the media of the second type is a shorter width media, roller 270 is controlled so that parts 275, 276 are moved with respect to each other to place roller 270 in a position where members 277 and 278 overlap each other to define a shorter width, and more specifically, a width that is suitable for shorter width media such as APS film (see FIGS. 22B and 23B).

Therefore, in the arrangement of FIG. 22A, the edges of a first type of media such as 35 mm film is inserted into grooves 6000*a*, 6000*b*, and the film is routed into drum 14' along path 8000. Thereafter, the film is processed in a manner similar to that described in the previous embodiment with respect to 35 mm film. In the arrangement of FIG. 22B, the edges of APS film are inserted into opposing grooves 5000*a*, 5000*b* and routed through processing drum 14' along path 8002 for processing in the manner as previously described with respect to APS film.

In the embodiment for FIGS. 22A and 22B it is noted that a disk is not required as in the previous embodiments. More specifically, in the embodiment of FIGS. 22A and 22B, once film is inserted into the appropriate grooves 6000*a*, 6000*b* or 5000*a*, 5000*b*, rollers 150 as shown, for example, in FIG. 12 and FIG. 18, rollers such as those shown in FIG. 17, and/or further rollers positioned along the processing paths can be utilized to drive the film into the processing drum in a manner similar to the previously described manner. After processing, the rotation of the appropriate rollers are reversed, to pull the film out in a manner analogous to the manner also previously described with respect to the first embodiment.

Although the embodiment of FIGS. 22A and 22B, as well as the description of agitating roller 270 of FIGS. 23A and 23B has been described with reference to 35 mm and APS film, the present invention is not limited thereto. It is recognized that roller 270 can be adjusted to various widths to accommodate a variety of films in addition to 35 mm and APS film. As an example, roller 270 can be adjusted to accommodate 120 format and 110 format film. In accommodating the various films, it is also noted that the positioning of the grooves as well as the size of the drum can be also varied to accommodate other format films such as 120 and 110 format film.

Figure 24:
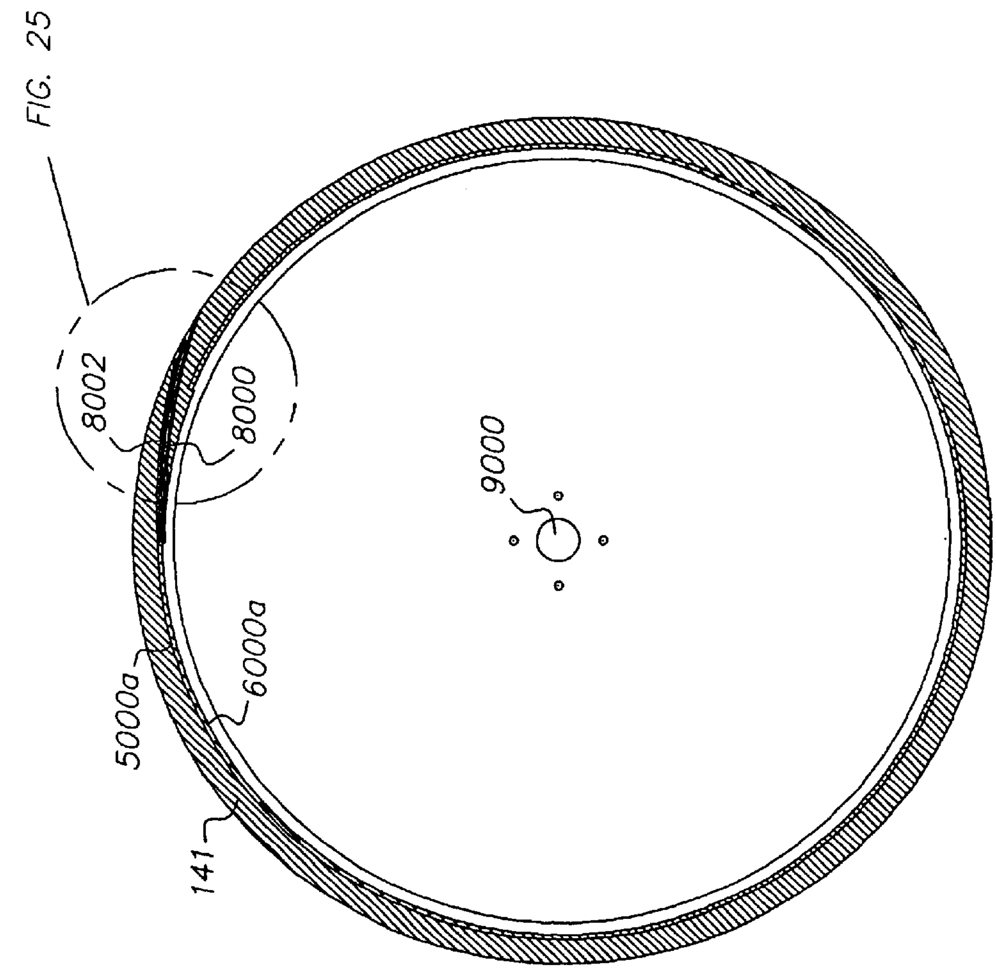
FIG. 24 is a cross-sectional side view of the interior of the processing drum of FIGS. 22A, 22B, showing the dual grooves.
Figure 25:
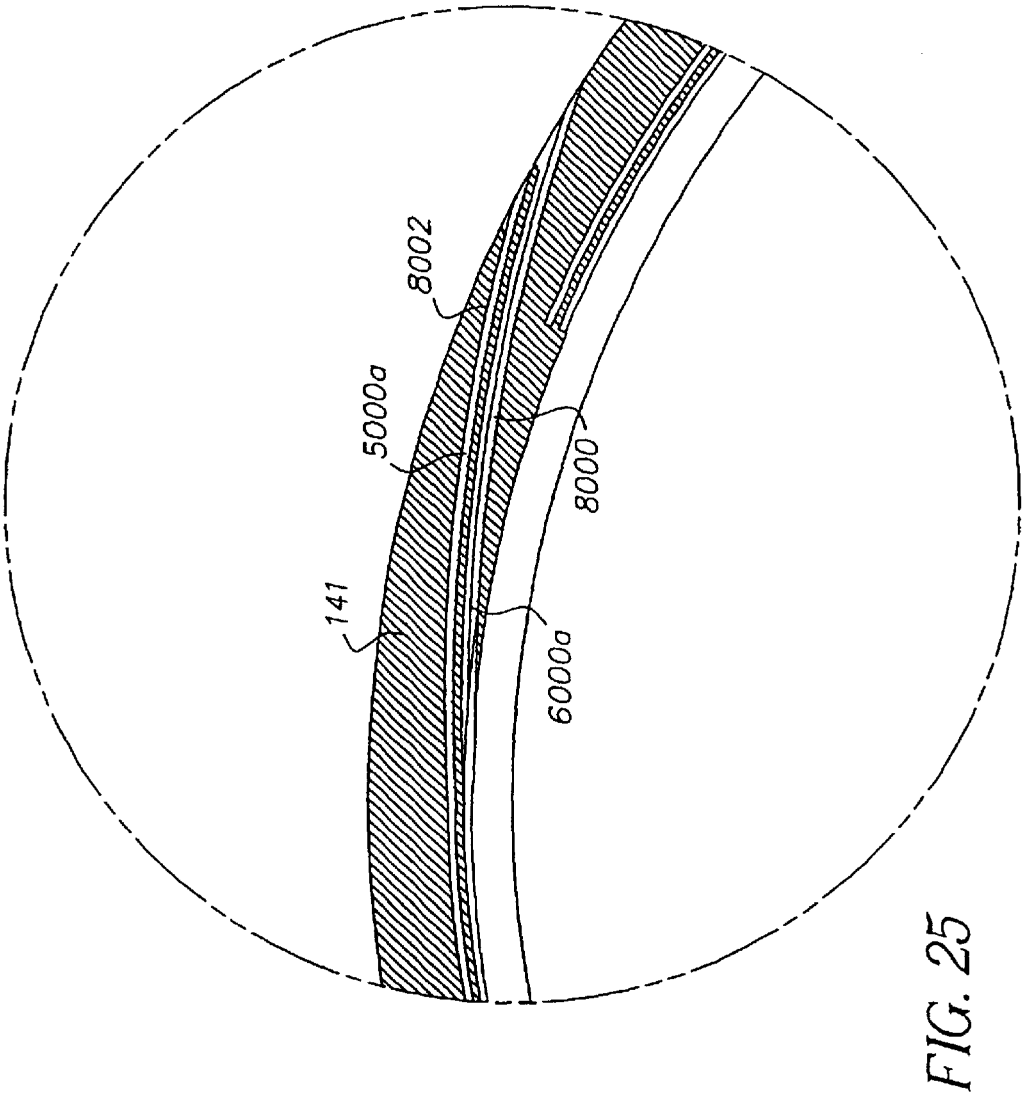
FIG. 25 is an isolated view of a section of the dual grooves of FIG. 24.

With reference to FIG. 24, a cross-sectional view of the inside of drum 14' focusing on the dual processing paths or grooves is illustrated. As an example, FIG. 24 shows wall 141 of drum 14', and more specifically, an interior of wall 141 so as to illustrate groove 6000*a* of processing path 8000 and groove 5000*a* of processing path 8002. As shown, groove 6000*a*is closer to rotational or center axis 9000 than groove 5000*a*. As also shown, processing paths 8000 and 8002 as defined by the grooves go substantially around the perimeter of drum 14' so as to permit the film to be inserted and pulled out of drum 14'. FIG. 25 illustrates a portion 8005 of FIG. 24, to more clearly show groove 8000*a* and groove 5000*a*.

Figure 26B:
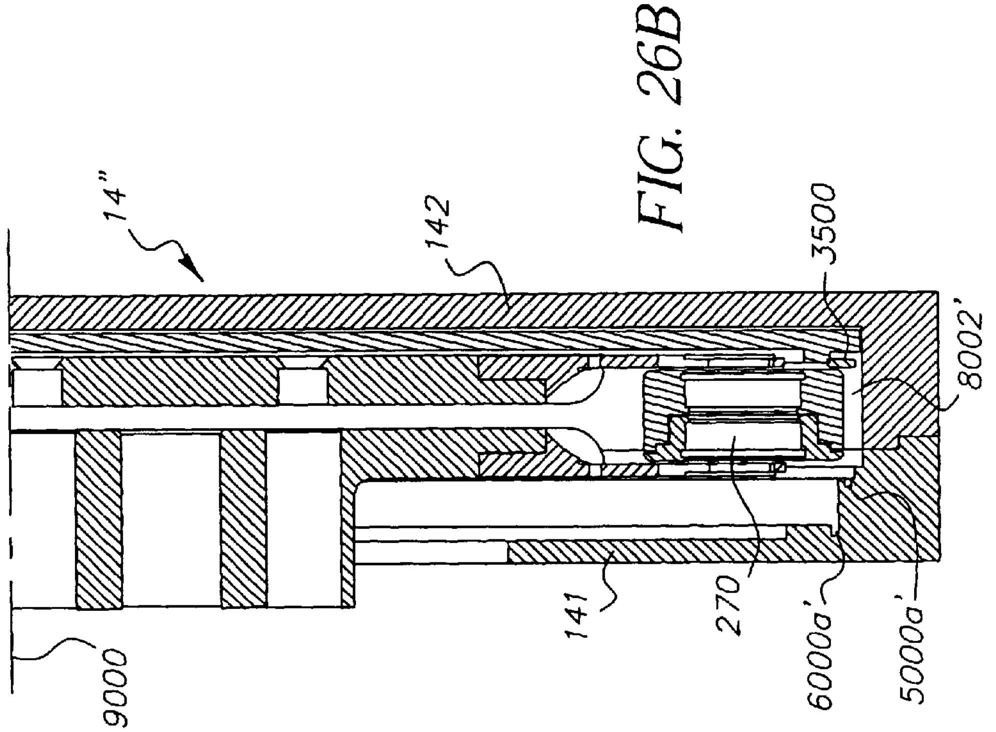
FIGS. 26A and 26B are cross-sectional views of a further embodiment of a dual groove processing drum having a disk in accordance with the present invention.
Figure 26A:
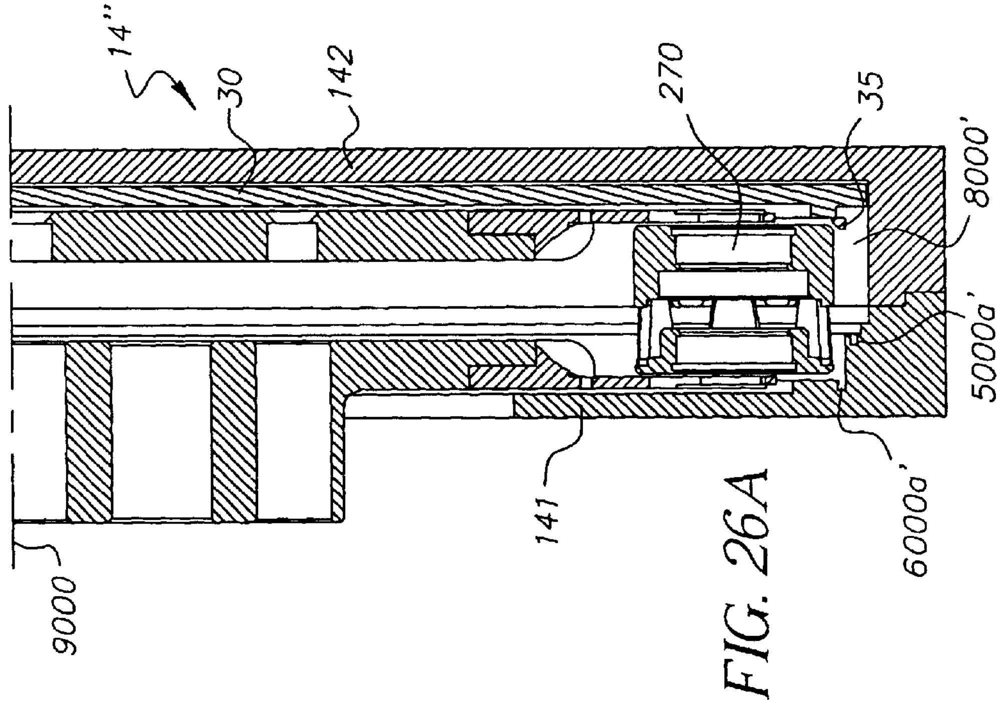

The embodiment of FIGS. 22A, 22B, 23A and 23B has been described with reference to a processing drum which does not utilize a disk. In the embodiment of FIGS. 26A and 26B, a further arrangement of a processing drum 14" is shown, wherein the processing drum includes dual grooves as noted above, but further utilizes disk 30 similar to the disk described in the first embodiment. Similar to drum 14' of FIGS. 22A and 22B, processing drum 14" of FIGS. 26A, 26B includes first wall 141 and second wall 142. First wall 141 of processing drum 14" includes a first groove 6000*a*' which is located a first distance from rotational or center axis 9000. Also positioned within wall 141 is a second groove 5000*a*' which is located a second distance from rotational or center axis 9000 which is longer than the first distance. Thus, groove 6000*a*' is located closer to the rotational axis of drum 14" than groove 5000*a*'. Unlike the embodiment of FIGS. 22A and 22B, drum 14" of FIGS. 26A and 26B does not include opposing grooves in wall 142. Instead, disk 30 with disk teeth 35 is positioned adjacent to wall 142.

As also shown in FIGS. 26A and 26B, agitating roller 270 is adapted to be expandable and moved between the state shown in FIG. 26A in which agitating roller 270 is expanded to a wide width state and moved to a position closer to rotational axis 9000, and the state shown in FIG. 26B where agitating roller 270 is in a smaller width state and moved to a location farther from rotational axis 9000.

Figures 27A, 27B:
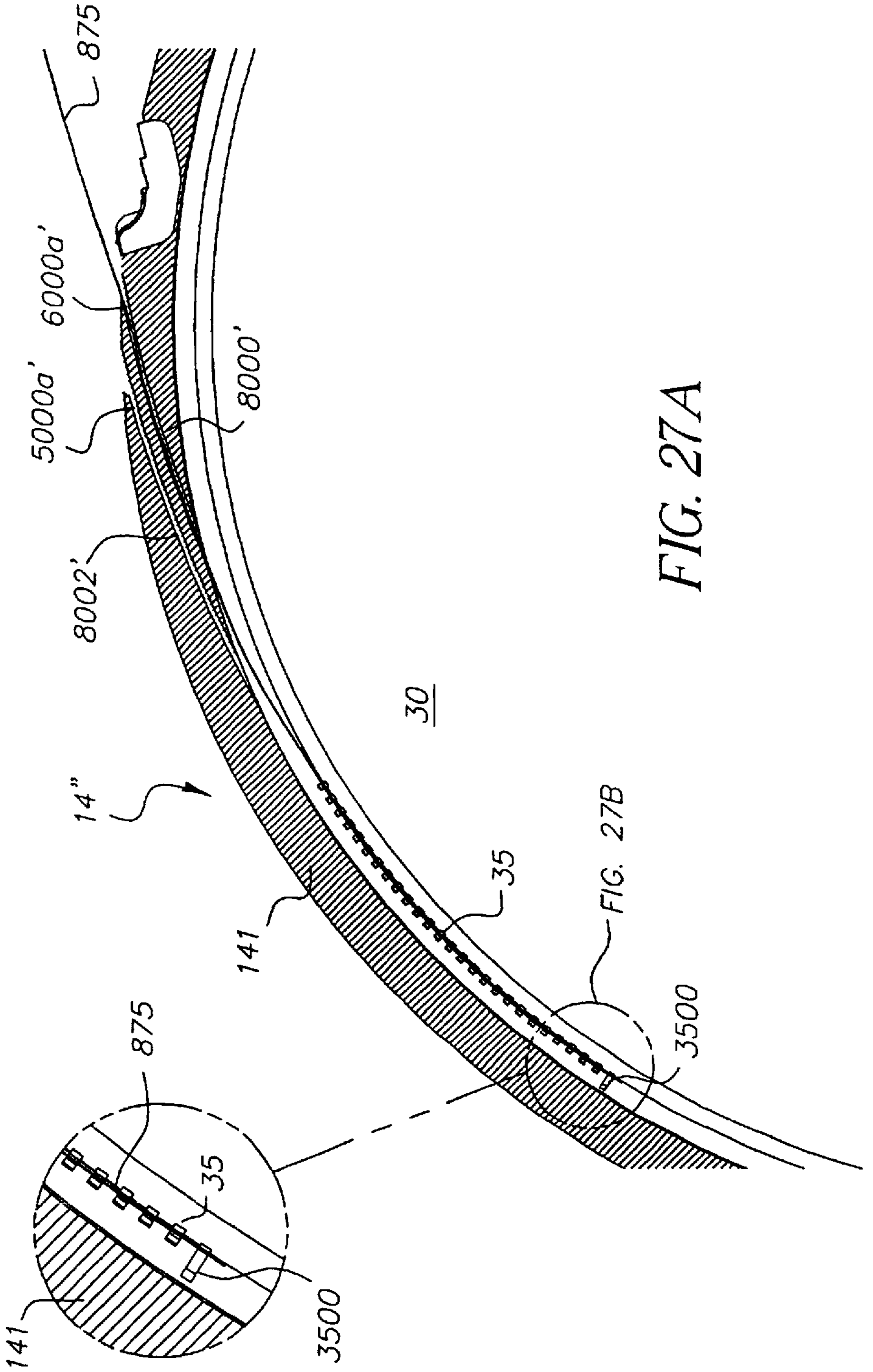
FIG. 27A is a view of a section of the drum of the present invention with 35 mm film being loaded.
FIG. 27B is a view of section of FIG. 27A.

Accordingly, with the embodiment of FIGS. 26A, 26B, when it is desired to process media of a first width and more specifically, larger width media such as 35 mm film, agitating roller 270 is located as shown in FIG. 26A. That is, agitating roller assembly 270 is placed in a wider width state and move closer to rotational axis 9000 so as to expose groove 6000*a*'. Therefore, 35 mm film can be loaded on drum 14" in a manner similar to the method described in the first embodiment; and the film can be positioned such that one edge of film 875 (see FIG. 27) is positioned within groove 6000*a*' while the second edge of film 875 and more specifically, holes in the second edge of film 875 is positioned so as to be interengaged with disk teeth 35 as shown in FIGS. 27A, 27B and described in the first embodiment. FIG. 27B shows a section 2700 of FIG. 27A. With this arrangement, a first path 8000' (FIG. 26A) is defined by groove 6000*a*', roller 270 and disk teeth 35. Thereafter, the film is conveyed through processing drum 14" and processed as previously described.

With reference to FIG. 26B, when it is desired to process media of a shorter width such as APS film, roller 270 is controlled so as to define a shorter width as shown in FIG. 26B, and is moved to a position closer to the lower portion of drum 14" as also shown in FIG. 26B. Thus, groove 6000*a*' is essentially blocked by roller 270, and a second processing path 8002' is defined by groove 5000*a*', roller 270 and gear teeth 35.

Figures 28A, 28B:
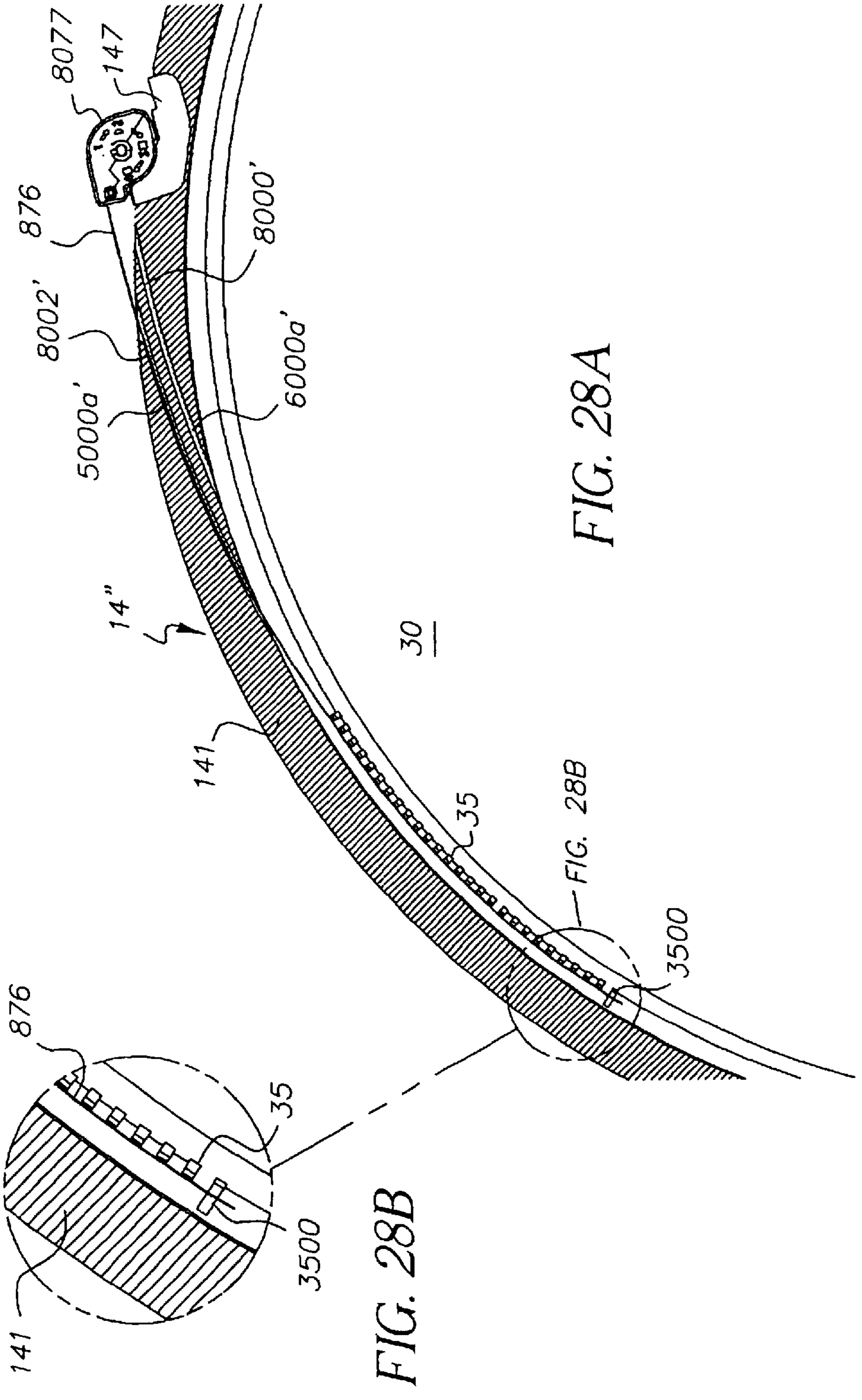
FIG. 28A is a view of a section of the processing drum of the present invention with APS film being loaded.
FIG. 28B is a view of a section of FIG. 28A.

In both the embodiments of FIGS. 26A and 26B, it is preferable that one of the disk teeth 35 be a larger length tooth to facilitate the interengagement of the teeth with the holes in the photographic film. Therefore, in the embodiment of FIG. 26B where shorter width media such as APS film is inserted, one edge of the film is positioned within groove 5000*a*', and holes on the second edge of the film are positioned so that disk tooth 3500 is inserted within or interengages with the hole. In the case of APS film, it is normal that only the leading edge of the film have holes. Therefore, with reference to FIGS. 28A and 28B, when an APS cartridge 8077 is positioned on loading area 147 as previously described with the first embodiment, film 876 can be inserted by positioning one edge within groove 5000*a*' and the second edge in a manner in which the holes on the second edge interengage with the disk teeth. As noted above, one of the disk teeth is preferably longer length disk tooth 3500, such that the longer length disk tooth 3500 will protrude through a leading edge hole of film 876. The remaining portions of film 876 can ride along the top of the normal length disk teeth 35 as shown in FIG. 28B which is a view of a section 2800 of FIG. 28A. Disk 30 is then rotated to position film 876 at the appropriate location for processing in a manner as described with respect to the first embodiment.

Therefore, in the case of APS or 35 mm film, the film is processed by supplying processing solution to the processing drum as previously described and also rotating the drum as also previously described. Furthermore, after processing, the film can be removed by being pulled from the drum in a manner similar to the manner described with respect to the first embodiment. Thus, with the dual groove arrangement as described, the present invention provides for a circular processing drum which can process multiple size media in a minimal amount of space. In one embodiment, a disk is not utilized, while in a second embodiment, a disk in combination with grooves is utilized. The grooves as described above provide a support to reduce any media damage and are positioned in such a way that only the proper amount of chemistry is added to the tank, for the proper size media, in order to reduce chemical waste. That is, as shown, for example, in FIGS. 22A and 22B, the combination of the grooves and the positioning of the agitating roller are such that they provide for processing paths in a confined space so as to minimize any chemical solution waste.

The present invention further facilitates the loading and unloading of photographic media, reduces chemical usage and provides for the processing of multiple types of media within a processing drum without the need for adjusting the dimensions of the processing drum itself. This combination of features provides for a processing drum which takes up a minimum amount of space.

The invention has been described in detail with particular reference to certain preferred embodiments thereof, but it will be understood that variations and modification can be effected within the spirit and scope of the invention.

What is claimed is:

1. A photographic processor comprising:

a processing drum having a center axis, said processing drum defining a first circular media path located a first distance from said center axis for processing a first type of photographic media, and a second circular photographic media path located a second distance from said center axis which is greater than said first distance for processing a second type of photographic media.

2. A photographic processor according to claim 1, wherein said processing drum further comprises a first wall, a second wall and a side wall extending around a perimeter of the drum.

3. A photographic processor according to claim 2, wherein:

said first circular media path comprises a first groove in said first wall and a second groove which opposes said first groove in said second wall, such that said first type of media in said first circular media path extends between said first and second grooves with opposing edges of said first type of media being located within said first and second grooves; and said second circular media path comprises a third groove in said first wall and a fourth groove which opposes said third groove in said second wall, such that said second type of media in said second circular media path extends between said third and fourth grooves with opposing edges of said second type of media being located within said third and fourth grooves.

4. A photographic processor according to claim 1, wherein said first type of photographic media is 35 mm film and said second type of photographic media is APS film.

5. A photographic processor according to claim 1, further comprising:

an agitating roller located within said drum, said agitating roller comprising a first roller member and a second roller member, said agitating roller being located within said drum so that media to be processed passes between said agitating roller and an inside perimeter surface of said drum, said first roller member and said second roller member being movable with respect to each other to define at least a first width corresponding to said first type of media and a second width which is smaller than said first width corresponding to said second type of media.

6. A photographic processor according to claim 5, wherein:

said agitating roller is movable between at least a first position relative to the center axis when the first and second roller members define said first width, and a second position relative to said center axis when said first and second roller members define said second width, said second position of said agitating roller being farther away from said center axis than said first position.

7. A photographic processor according to claim 1, further comprising:

at least one conveying roller for conveying the first type of media along said first media path or said second type of media along said second media path.

8. A photographic processor comprising:

a processing drum having a first wall, a second wall which opposes said first wall, and a side wall which extends around a perimeter of said drum, said processing drum further comprising a rotational axis;

first and second grooves defined in one of said first or second walls, said first groove being located a first distance from said rotational axis and said second groove being located a second distance from said rotational axis which is greater than said first distance; and a disk positioned inside said drum adjacent to the other of said first or second walls, said disk having disk teeth thereon which are capable of interengaging with holes along an edge of photographic film to be processed;

wherein:

a first film path for processing a first type of film is defined between said first groove and said disk, such that a first edge of said first type of film is inserted in said first groove and at least one hole on a second edge of said first type of film is interengaged with the disk teeth on said disk; and a second film path for processing a second type of film is defined between said second groove and said disk, such that a first edge of said second type of film is inserted in said second groove and at least one hole on a second edge of said second type of film is interengaged with the disk teeth on said disk.

9. A photographic processor according to claim 8, wherein said first type of film is 35 mm film and said second type of film is APS film.

10. A photographic processor according to claim 8, further comprising:

an agitating roller located within said drum, said agitating roller comprising a first roller member and a second roller member, said agitating roller being located within said drum so that film to be processed passes between said agitating roller and an inside perimeter surface of said drum, said first roller member and said second roller member being movable with respect to each other to define at least a first width corresponding to said first type of film and a second width which is smaller than said first width corresponding to said second type of film.

11. A photographic processor according to claim 10, wherein:

said agitating roller is movable between at least a first position relative to said rotational axis when the first and second roller members define said first width, and a second position relative to said rotational axis when said first and second roller members define said second width, said second position of said agitating roller being farther away from said rotational axis than said first position.

12. A method of processing photographic material, the method comprising the steps of:

inserting a photographic film to be processed into one of first and second circular film paths located in a circular processing drum having a center axis in accordance with a type of said photographic film, said first circular film path being located a first distance from said center axis and being adapted to receive a first type of said photographic film, and said second circular film path being located a second distance from said center axis which is greater than said first distance and being adapted to receive a second type of said photographic film; and processing said inserted photographic film in said processing drum.

13. A method according to claim 12, wherein the first type of said photographic film is one of 35 mm or APS film, and the second type of said photographic film is the other of 35 mm and APS film.

14. A method according to claim 12, wherein said first and second circular paths comprises grooves formed in walls of said processing drum.

* * * * *